US012009585B2

(12) United States Patent
Woo

(10) Patent No.: US 12,009,585 B2
(45) Date of Patent: Jun. 11, 2024

(54) ELECTRONIC DEVICE EQUIPPED WITH TRANSPARENT ANTENNA

(71) Applicant: LG ELECTRONICS INC., Seoul (KR)

(72) Inventor: Seungmin Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 264 days.

(21) Appl. No.: 17/632,218

(22) PCT Filed: Aug. 22, 2019

(86) PCT No.: PCT/KR2019/010670
§ 371 (c)(1),
(2) Date: Feb. 1, 2022

(87) PCT Pub. No.: WO2021/033806
PCT Pub. Date: Feb. 25, 2021

(65) Prior Publication Data

US 2022/0278445 A1 Sep. 1, 2022

(51) Int. Cl.
*H01Q 1/36* (2006.01)
*H01Q 1/24* (2006.01)
(Continued)

(52) U.S. Cl.
CPC ................. *H01Q 1/36* (2013.01); *H01Q 1/24* (2013.01); *H01Q 1/243* (2013.01); *H01Q 13/10* (2013.01); *H01Q 21/08* (2013.01)

(58) Field of Classification Search
CPC .......... H01Q 1/36; H01Q 1/243; H01Q 13/10; H01Q 21/08; H01Q 1/24
(Continued)

(56) References Cited

U.S. PATENT DOCUMENTS

2020/0243959 A1* 7/2020 Ryu ..................... H01Q 9/0407
2020/0251814 A1* 8/2020 Ryu ......................... H01Q 7/00
(Continued)

FOREIGN PATENT DOCUMENTS

KR 1019990063985 7/1999
KR 1020160054848 5/2016
(Continued)

OTHER PUBLICATIONS

PCT International Application No. PCT/KR2019/010670, International Search Report dated May 22, 2020, 2 pages.

*Primary Examiner* — Hai V Tran
(74) *Attorney, Agent, or Firm* — LEE, HONG, DEGERMAN, KANG & WAIMEY

(57) ABSTRACT

Provided, according to the present invention, is an electronic device equipped with a transparent antenna for 5G communication. The electronic device comprises: an antenna embedded and operating in a display; and a transmission line for feeding power to the antenna. The antenna comprises: a feeder portion connected to the transmission line and composed of metal mesh lines disposed parallel with respect to the boundary line of the transmission line; and a slot region formed in the antenna and composed of orthogonal metal mesh lines disposed orthogonal to the metal mesh lines, wherein in the electronic device equipped with a transparent antenna, the metal mesh lines are disposed orthogonal to an antenna area in the slot region and a dielectric area in addition to the antenna area, thereby improving electrical characteristics in a high-frequency band.

18 Claims, 22 Drawing Sheets

(51) Int. Cl.
*H01Q 13/10* (2006.01)
*H01Q 21/08* (2006.01)

(58) Field of Classification Search
USPC .......................................................... 343/720
See application file for complete search history.

(56) References Cited

U.S. PATENT DOCUMENTS

2020/0403301 A1* 12/2020 Ryu ......................... H01Q 1/46
2020/0411959 A1* 12/2020 Ryu ..................... H01Q 9/0407

FOREIGN PATENT DOCUMENTS

KR 101940797 1/2019
KR 101962819 3/2019
KR 101962821 7/2019

* cited by examiner

S Parameter Plot 1

ELECTRONIC DEVICE EQUIPPED WITH TRANSPARENT ANTENNA

CROSS-REFERENCE TO RELATED APPLICATIONS

This application is the National Stage filing under 35 U.S.C. 371 of International Application No. PCT/KR2019/010670, filed on Aug. 22, 2019, the contents of which are all incorporated by reference herein in its entirety.

TECHNICAL FIELD

The present disclosure relates to an electronic device having a transparent antenna, and one detailed implementation relates to an electronic device having a transparent antenna disposed in a display.

BACKGROUND ART

Electronic devices may be divided into mobile/portable terminals and stationary terminals according to mobility. Also, the electronic devices may be classified into handheld types and vehicle mount types according to whether or not a user can directly carry.

Functions of electronic devices are diversifying. Examples of such functions include data and voice communications, capturing images and video via a camera, recording audio, playing music files via a speaker system, and displaying images and video on a display. Some electronic devices include additional functionality which supports electronic game playing, while other terminals are configured as multimedia players. Specifically, in recent time, mobile terminals can receive broadcast and multicast signals to allow viewing of video or television programs As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. In the future, it is expected that a wireless communication system using a 5G communication technology will be commercialized to provide various services. Meanwhile, some of LTE frequency bands may be allocated to provide 5G communication services.

In this regard, the mobile terminal may be configured to provide 5G communication services in various frequency bands. Recently, attempts have been made to provide 5G communication services using a Sub-6 band under a 6 GHz band. In the future, it is also expected to provide 5G communication services by using a millimeter-wave (mmWave) band in addition to the Sub-6 band for a faster data rate.

Meanwhile, a 28 GHz band, a 39 GHz band, and a 64 GHz band are being considered as frequency bands to be allocated for 5G communication services in such mmWave bands. In this regard, a plurality of array antennas may be disposed in an electronic device in the mmWave bands.

In addition to the plurality of array antennas, a plurality of other antennas may be disposed in the electronic device.

Therefore, there is a need to transmit and receive signals through a front part of the electronic device while preventing interference with a plurality of existing antennas. To this end, research on a transparent antenna implemented as metal mesh lines embedded in a display of an electronic device is being conducted.

Meanwhile, in the transparent antenna having the metal mesh structure, a metal pattern may be implemented as a metal mesh line. However, it should be considered how to form a region where no metal is disposed, for example, a slot region inside the antenna or a dielectric region outside the antenna.

In this regard, if a metal mesh line is not disposed at the slot region inside the antenna or the dielectric region outside the antenna, there is a problem in that the metal mesh line is suddenly disconnected, which may cause a signal loss in a high frequency band.

In addition, if the metal mesh line is not disposed at the slot region inside the antenna or the dielectric region outside the antenna, there is a problem in that visibility is reduced between a region where the mesh line is disposed and a region where the mesh line is not disposed.

Technical Problem

The present disclosure is directed to solving the aforementioned problems and other drawbacks. The present disclosure also describes a method of implementing non-metal regions inside and outside an antenna in an electronic device having a transparent antenna.

The present disclosure further describes a way of solving a decrease in visibility depending on whether or not a metal mesh line is disposed in a display having a transparent antenna.

The present disclosure further describes maintenance of an antenna performance while solving issues such as visibility and the like in a display having a transparent antenna.

Technical Solution

According to one aspect of the subject matter described in this application, an electronic device having a transparent antenna for 5G communication is provided. The electronic device may include an antenna embedded and operating in a display, and a transmission line for feeding the antenna. Here, the antenna may include a feeder connected to the transmission line and including metal mesh lines arranged parallel to a boundary of the transmission line, and a slot region defined inside the antenna and including orthogonal metal mesh lines arranged in a direction orthogonal to the metal mesh lines of the feeder. Accordingly, in the electronic device having the transparent antenna, such metal mesh lines can be arranged even in the slot region and a dielectric region, in addition to an antenna region, to be orthogonal to metal mesh lines in the antenna region, thereby improving electrical characteristics in a high frequency band. In some implementations, in the electronic device having the transparent antenna, visibility can be improved by the metal mesh lines arranged to be orthogonal to the metal mesh lines in antenna region and dummy mesh lines, thereby enhancing electrical characteristics such as antenna efficiency and the like.

In some implementations, the slot region may include a first slot region including the orthogonal metal mesh lines, and a second slot region having a slot with a width different from that of the first slot region, separated by a gap from the orthogonal metal mesh lines in the slot, and including second orthogonal metal mesh lines parallel to the orthogonal metal mesh lines.

In some implementations, the antenna may further include a radiator region configured in a square mesh line form to radiate a signal transmitted from the feeder.

In some implementations, first dummy metal lines may further be arranged on one side region and another side region adjacent to the radiator region. The first dummy metal lines may be parallel to the metal mesh lines of the feeder and orthogonal to the orthogonal metal mesh lines of the slot region, which can prevent a deterioration of visibility caused due to non-arrangement of metal mesh lines on a specific region in a display having a transparent antenna.

In some implementations, second dummy metal lines may further be arranged on an upper region adjacent to the radiator region. The second dummy metal lines may be orthogonal to the metal mesh lines of the feeder and parallel to the orthogonal metal mesh lines of the slot region, which can prevent a deterioration of visibility caused due to non-arrangement of metal mesh lines on a specific region in a display having a transparent antenna.

In some implementations, a first gap may be defined between the second dummy metal lines arranged on right and left regions of the upper region and the second dummy metal lines arranged on a central region of the upper region, to prevent a generation of surface current on a dielectric substrate.

In some implementations, the second dummy metal lines arranged on the central region of the upper region may have an electrical length corresponding to a substantially half-wavelength of an operating frequency to prevent interference with respect to the second dummy metal lines arranged on the left and right regions of the upper region.

In some implementations, the first dummy metal lines and the second dummy metal lines may be arranged to be orthogonal to each other. A second gap may be defined between the first dummy metal lines and the second dummy metal lines to prevent a generation of surface current on a dielectric substrate.

In some implementations, the transmission line may be configured to have a Co-Planar Waveguide (CPW) line structure that may include an inner conductor region operating as a signal line, an outer conductor region operating as a ground, and a dielectric region disposed between the inner conductor region and the outer conductor region.

In some implementations, the antenna may include the metal mesh lines disposed on a dielectric to define a transparent region, and the CPW line structure may include printed metal patterns disposed on the dielectric to define a non-transparent region.

In some implementations, the CPW line structure may include metal mesh lines disposed on a dielectric to define a transparent region, and the antenna may include metal mesh lines disposed on a dielectric to define the transparent region.

In some implementations, the antenna and the CPW line may be disposed on dielectrics of different layers, and the CPW line may be disposed below the antenna and a signal transmitted through the CPW line may be radiated through the slot region of the antenna region.

In some implementations, the antenna and the CPW line may be disposed on a dielectric of the same layer, and a strip line that is the inner conductor region of the CPW line may be connected to the feeder.

In some implementations, the antenna may be configured as an array antenna for beamforming. Each antenna element of the array antenna may be connected to an inner conductor of the CPW line. The electronic device may further include a transceiver circuit disposed on a rear surface of the display, connected to each antenna element of the array antenna, and configured to transmit a signal to each antenna element.

In some implementations, the array antenna may include first to fourth array antennas disposed at upper left, upper right, lower left, and lower right portions inside the display of the electronic device. The transceiver circuit may further include first to fourth transceiver circuits configured to transmit signals to the first to fourth array antennas, respectively.

An electronic device according to another aspect of the present disclosure may include a display, and an array antenna disposed inside the display and including metal mesh lines. Each antenna element of the array antenna may include a feeder connected to a transmission line and including metal mesh lines arranged parallel to a boundary of the transmission line, and a slot region defined inside the antenna and including orthogonal metal mesh lines arranged in a direction orthogonal to the metal mesh lines of the feeder.

In some implementations, the slot region may include a first slot region including the orthogonal metal mesh lines, and a second slot region having a slot with a width different from that of the first slot region, separated by a gap from the orthogonal metal mesh lines in the slot, and including second orthogonal metal mesh lines parallel to the orthogonal metal mesh lines.

In some implementations, the antenna element may further include a radiator region configured in a square mesh line form to radiate a signal transmitted from the feeder.

In some implementations, first dummy metal lines may further be arranged on one side region and another side region adjacent to the radiator region. The first dummy metal lines may be parallel to the metal mesh lines of the feeder and orthogonal to the orthogonal metal mesh lines of the slot region.

In some implementations, second dummy metal lines may further be arranged on an upper region adjacent to the radiator region. The second dummy metal lines may be orthogonal to the metal mesh lines of the feeder and parallel to the orthogonal metal mesh lines of the slot region, and a gap may be defined between the second dummy metal lines arranged on right and left regions of the upper region and the second dummy metal lines arranged on a central region of the upper region.

Advantageous Effects of Invention

In some implementations, in an electronic device having a transparent antenna, metal mesh lines may also be arranged in a slot region and a dielectric region, in addition to an antenna region, to be orthogonal to metal mesh lines on the antenna region, thereby improving electrical characteristics in a high frequency band.

In some implementations, a problem of deteriorating visibility due to non-arrangement of metal mesh lines in a specific region of a display having a transparent antenna can be prevented.

In some implementations, in an electronic device having a transparent antenna, visibility can be improved by metal mesh lines arranged to be orthogonal to an antenna region and dummy mesh lines, thereby enhancing electrical characteristics such as antenna efficiency and the like.

Further scope of applicability of the present disclosure will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

MODE FOR THE INVENTION

Figure 1A:
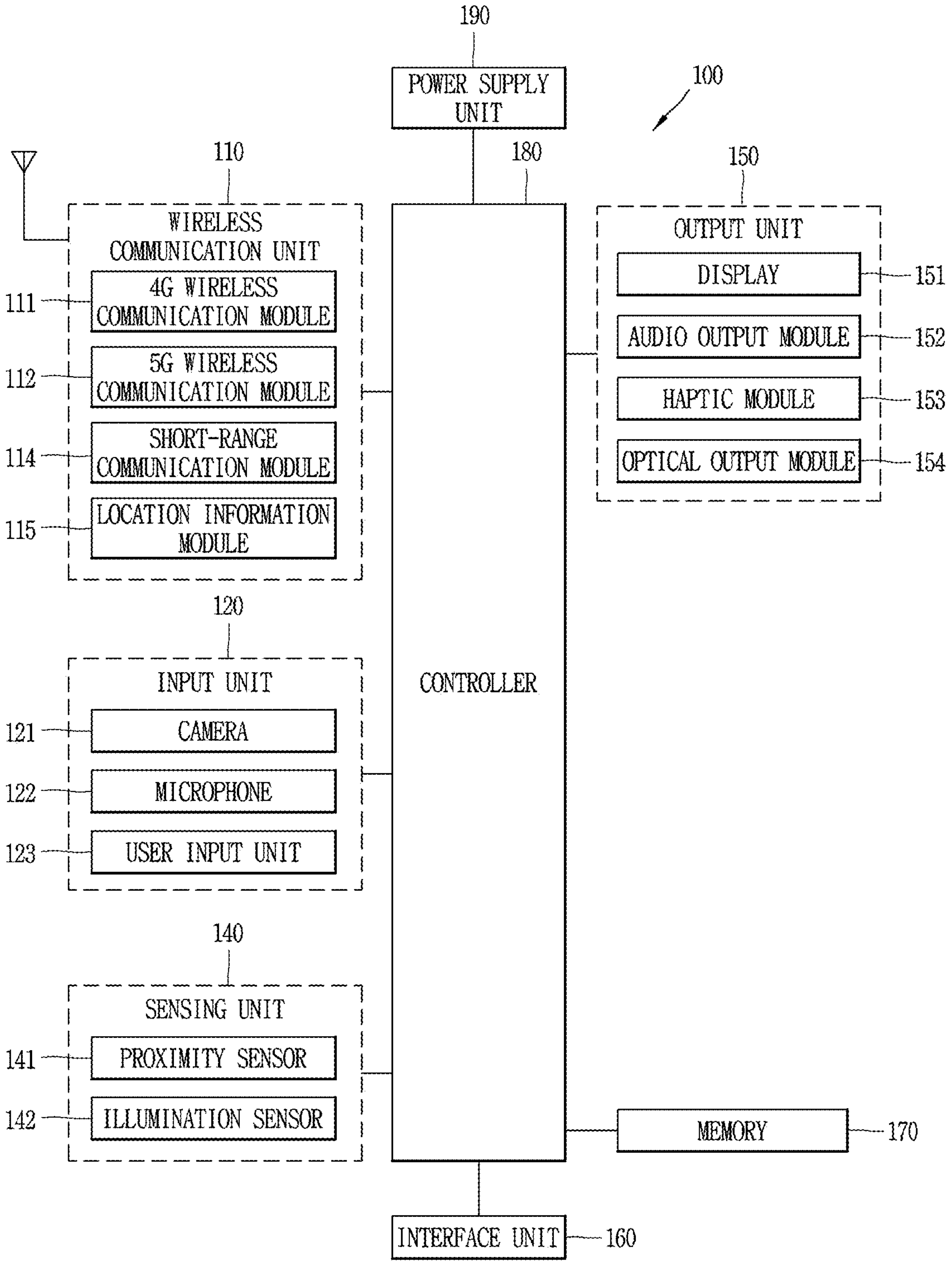
FIG. 1A is a block diagram of an electronic device in accordance with one implementation.

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as “module” and “unit” may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being “connected with” another element, the element can be connected with the another element or intervening elements may also be present. In contrast, when an element is referred to as being “directly connected with” another element, there are no intervening elements present.

A singular representation may include a plural representation unless it represents a definitely different meaning from the context.

Terms such as “include” or “has” are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signages, and the like.

Figure 1B:
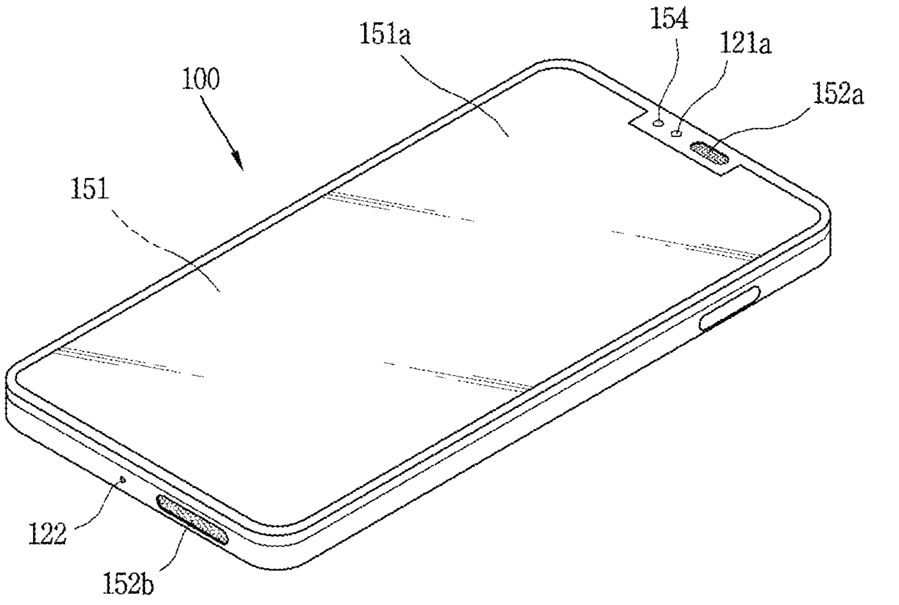
FIGS. 1B and 1C are conceptual views illustrating one example of the electronic device, viewed from different directions.
Figure 1C:
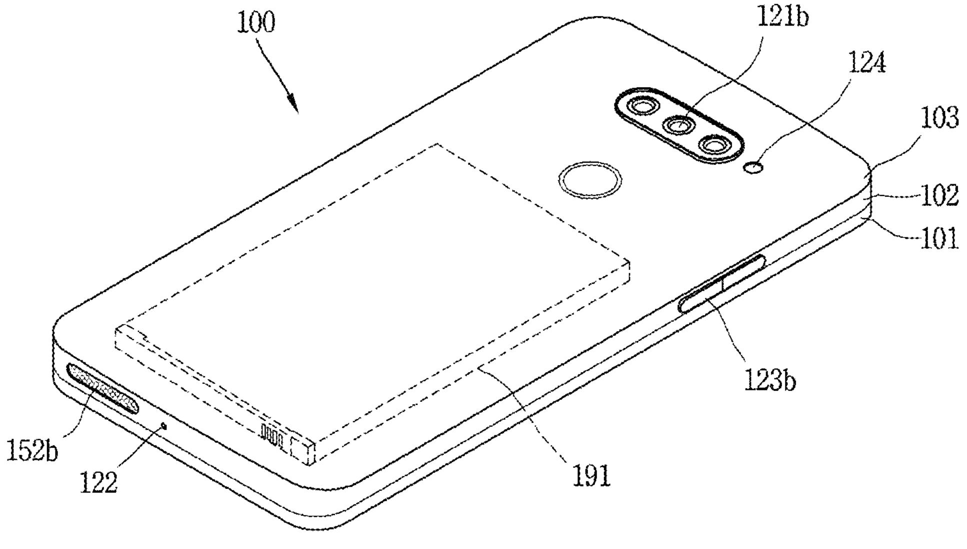

Referring to FIGS. 1A to 1C, FIG. 1A is a block diagram of an electronic device in accordance with one implementation of the present disclosure, and FIGS. 1B and 1C are conceptual views illustrating one example of an electronic device according to the present disclosure, viewed from different directions.

The electronic device 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, among others, the wireless communication unit 110 may typically include one or more modules which permit communications such as wireless communications between the electronic device 100 and a wireless communication system, communications between the electronic device 100 and another electronic device, or communications between the electronic device 100 and an external server. Further, the wireless communication unit 110 may typically include one or more modules which connect the electronic device 100 to one or more networks. Here, the one or more networks may be, for example, a 4G communication network and a 5G communication network.

The wireless communication unit 110 may include at least one of a 4G wireless communication module 111, a 5G wireless communication module 112, a short-range communication module 113, and a location information module 114.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station.

In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) structure. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE re-farming. In some examples, a Sub 6 frequency band, which is a range of 6 GHz or less, may be used as the 5G frequency band.

On the other hand, a millimeter-wave (mmWave) range may be used as the 5G frequency band to perform wideband high-speed communication. When the mmWave band is used, the electronic device 100 may perform beamforming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication unit 110 may be in a Dual Connectivity (DC) state with the 4G base station and the 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, if the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112.

The short-range communication module 113 is configured to facilitate short-range communications. Suitable technologies for implementing such short-range communications include BLUETOOTH™, Radio Frequency Identification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area network. One example of the wireless area networks is a wireless personal area network.

Short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and a WiFi communication module. In this regard, 4G+WiFi CA may be performed using the 4G wireless communication module 111 and the Wi-Fi communication module 113. Or, 5G+WiFi CA may be performed using the 5G wireless communication module 112 and the Wi-Fi communication module 113.

The location information module 114 may be generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless Access Point (AP) which transmits or receives a wireless signal to or from the Wi-Fi module. If desired, the location information module 114 may alternatively or additionally function with any of the other modules of the wireless communication unit 110 to obtain data related to the position of the electronic device. The location information module 114 is a module used for acquiring the position (or the current position) and may not be limited to a module for directly calculating or acquiring the position of the electronic device.

Specifically, when the electronic device utilizes the 5G wireless communication module 112, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensor unit 140 may typically be implemented using one or more sensors configured to sense internal information of the electronic device, the surrounding environment of the electronic device, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output unit 150 may typically be configured to output various types of information, such as audio, video, tactile output, and the like. The output unit 150 may be shown having at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user.

The interface unit 160 serves as an interface with various types of external devices that are coupled to the electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. Some of these application programs may be downloaded from an external server via wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

The controller 180 typically functions to control an overall operation of the electronic device 100, in addition to the operations associated with the application programs. The control unit 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control a combination of at least two of those components included in the electronic device 100 to activate the application program.

The power supply unit 190 may be configured to receive external power or provide internal power in order to supply appropriate power required for operating elements and components included in the electronic device 100. The power supply unit 190 may include a battery, and the battery may be configured to be embedded in the terminal body, or configured to be detachable from the terminal body.

At least part of the components may cooperably operate to implement an operation, a control or a control method of an electronic device according to various implementations disclosed herein. Also, the operation, the control or the control method of the portable electronic device may be implemented on the portable electronic device by an activation of at least one application program stored in the memory 170.

Referring to FIGS. 1B and 1C, the disclosed electronic device 100 includes a bar-like terminal body. However, the present disclosure may not be necessarily limited to this, and may be also applicable to various structures such as a watch type, a clip type, a glasses type, a folder type in which two or more bodies are coupled to each other in a relatively movable manner, a flip type, a slide type, a swing type, a swivel type, and the like. Discussion herein will often relate to a particular type of electronic device. However, such teachings with regard to a particular type of electronic device will generally be applied to other types of electronic devices as well.

Here, considering the electronic device 100 as at least one assembly, the terminal body may be understood as a conception referring to the assembly.

The electronic device 100 will generally include a case (for example, frame, housing, cover, and the like) forming the appearance of the terminal. In this embodiment, the electronic device 100 may include a front case 101 and a rear case 102. Various electronic components may be incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted on the rear case 102 are exposed to the outside. Meanwhile, part of a side surface of the rear case 102 may be implemented to operate as a radiator.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121*b* or an audio output module 152*b*.

The electronic device 100 may include a display unit 151, first and second audio output module 152*a* and 152*b*, a proximity sensor 141, an illumination sensor 142, an optical output module 154, first and second cameras 121*a* and 121*b*, first and second manipulation units 123*a* and 123*b*, a microphone 122, an interface unit 160, and the like.

The display 151 is generally configured to output information processed in the electronic device 100. For example, the display 151 may display execution screen information of an application program executing at the electronic device 100 or user interface (UI) and graphic user interface (GUI) information in response to the execution screen information.

The display 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a control unit 180 may generate a control command corresponding to the touch. Contents input in the touch manner may be characters, numbers, instructions in various modes, or a menu item that can be specified.

In this way, the display unit 151 may form a touch screen together with the touch sensor, and in this case, the touch screen may function as the user input unit (123, see FIG. 1A). In some cases, the touch screen may replace at least some of functions of a first manipulation unit 123*a*.

The first audio output module 152*a* may be implemented as a receiver for transmitting a call sound to a user's ear and the second audio output module 152*b* may be implemented as a loud speaker for outputting various alarm sounds or multimedia playback sounds.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the control unit 180 may control the optical output module 154 to stop the light output.

The first camera 121*a* may process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the electronic device 100. The first and second manipulation units 123*a* and 123*b* may also be commonly referred to as a manipulating portion. The first and second manipulation units 123*a* and 123*b* may employ any method if it is a tactile manner allowing the user to perform manipulation with a tactile feeling such as touch, push, scroll or the like. The first and second manipulation units 123*a* and 123*b* may also be manipulated through a proximity touch, a hovering touch, and the like, without a user's tactile feeling.

On the other hand, the electronic device 100 may include a finger scan sensor which scans a user's fingerprint. The controller 180 may use fingerprint information sensed by the finger scan sensor as an authentication means. The finger scan sensor may be installed in the display unit 151 or the user input unit 123.

The microphone 122 may be provided at a plurality of places, and configured to receive stereo sounds. The microphone 122 may be provided at a plurality of places, and configured to receive stereo sounds.

The interface unit 160 may serve as a path allowing the electronic device 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the electronic device 100. The interface unit 160 may be implemented in the form of a socket for accommodating an external card, such as Subscriber Identification Module (SIM), User Identity Module (UIM), or a memory card for information storage.

The second camera 121*b* may be further mounted to the rear surface of the terminal body. The second camera 121*b* may have an image capturing direction, which is substantially opposite to the direction of the first camera unit 121*a*.

The second camera 121*b* may include a plurality of lenses arranged along at least one line. The plurality of lenses may be arranged in a matrix form. The cameras may be referred to as an 'array camera.' When the second camera 121*b* is implemented as the array camera, images may be captured in various manners using the plurality of lenses and images with better qualities may be obtained.

The flash 124 may be disposed adjacent to the second camera 121*b*. When an image of a subject is captured with the camera 121*b*, the flash 124 may illuminate the subject.

The second audio output module **152*b* may further be disposed on the terminal body. The second audio output module 152*b* may implement stereophonic sound functions in conjunction with the first audio output module 152*a***, and may be also used for implementing a speaker phone mode for call communication.

At least one antenna for wireless communication may be disposed on the terminal body. The antenna may be embedded in the terminal body or formed in the case. Meanwhile, a plurality of antennas connected to the 4G wireless communication module 111 and the 5G wireless communication module 112 may be arranged on a side surface of the terminal. Alternatively, an antenna may be formed in a form of film to be attached onto an inner surface of the rear cover 103 or a case including a conductive material may serve as an antenna.

Meanwhile, the plurality of antennas arranged on a side surface of the terminal may be implemented with four or more antennas to support MIMO. In addition, when the 5G wireless communication module 112 operates in a millimeter-wave (mmWave) band, as each of the plurality of antennas is implemented as an array antenna, a plurality of array antennas may be arranged in the electronic device.

The terminal body is provided with a power supply unit 190 (see FIG. 1A) for supplying power to the electronic device 100. The power supply unit 190 may include a batter 191 which is mounted in the terminal body or detachably coupled to an outside of the terminal body.

Hereinafter, description will be given of embodiments of a multi-transmission system and an electronic device having the same, specifically, a power amplifier in a heterogeneous radio system and an electronic device having the same according to the present disclosure, with reference to the accompanying drawings. It will be apparent to those skilled in the art that the present disclosure may be embodied in other specific forms without departing from the idea or essential characteristics thereof.

Figure 2:
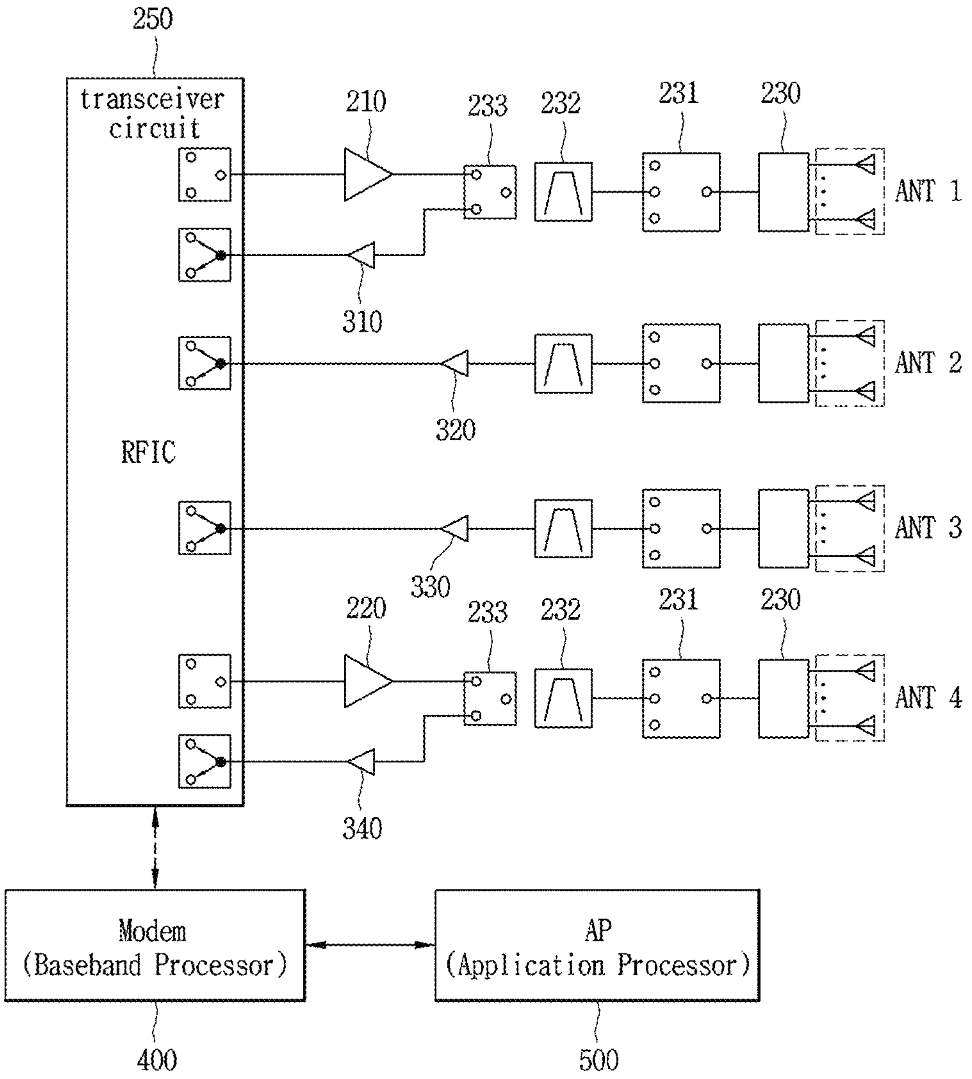
FIG. 2 is a block diagram illustrating an exemplary configuration of a wireless communication unit of an electronic device operable in a plurality of wireless communication systems.

FIG. 2 is a block diagram illustrating a configuration of a wireless communication unit of an electronic device operable in a plurality of wireless communication systems according to an embodiment. Referring to FIG. 2, the electronic device may include a first power amplifier 210, a second power amplifier 220, and an RFIC 250. In addition, the electronic device may further include a modem 400 and an application processor (AP) 500. Here, the modem 400 and the application processor (AP) 500 may be physically implemented on a single chip, and may be implemented in a logically and functionally separated form. However, the present disclosure is not limited thereto and may be implemented in the form of a chip that is physically separated according to an application.

Meanwhile, the electronic device may include a plurality of low noise amplifiers (LNAs) 410 to 440 in the receiver. Here, the first power amplifier 210, the second power amplifier 220, a power and phase controller 230, a controller 250, and the plurality of low noise amplifiers 310 to 340 may all be operable in a first communication system and a second communication system. In this case, the first communication system and the second communication system may be a 4G communication system and a 5G communication system, respectively.

As illustrated in FIG. 2, the RFIC 250 may be configured as a 4G/5G integrated type, but the present disclosure may not be limited thereto. The RFIC 250 may be configured as a 4G/5G separate type according to an application. When the RFIC 250 is configured as the 4G/5G integrated type, it may be advantageous in terms of synchronization between 4G and 5G circuits, and also there may be an advantage that control signaling by the modem 400 can be simplified.

On the other hand, when the RFIC 250 is configured as the 4G/5G separate type, it may be referred to as a 4G RFIC and a 5G RFIC, respectively. In particular, when there is a great band difference between the 5G band and the 4G band, such as when the 5G band is configured as a millimeter wave band, the RFIC 250 may be configured as a 4G/5G separated type. As such, when the RFIC 250 is configured as the 4G/5G separate type, there may be an advantage that the RF characteristics can be optimized for each of the 4G band and the 5G band.

Meanwhile, even when the RFIC 250 is configured as a 4G/5G separation type, the 4G RFIC and the 5G RFIC may be logically and functionally separated but physically implemented on a single chip.

On the other hand, the application processor (AP) 500 may be configured to control the operation of each component of the electronic device. Specifically, the application processor (AP) 500 may control the operation of each component of the electronic device through the modem 400.

For example, the modem 400 may be controlled through a power management IC (PMIC) for low power operation of the electronic device. Accordingly, the modem 400 may operate power circuits of a transmitter and a receiver through the RFIC 250 in a low power mode.

In this regard, when it is determined that the electronic device is in an idle mode, the application processor (AP) 500 may control the RFIC 250 through the modem 400 as follows. For example, when the electronic device is in an idle mode, the application processor 1450 may control the RFIC 250 through the modem 400, such that at least one of the first and second power amplifiers 110 and 120 operates in a low power mode or is turned off.

According to another implementation, the application processor (AP) 500 may control the modem 400 to enable wireless communication capable of performing low power communication when the electronic device is in a low battery mode. For example, when the electronic device is connected to a plurality of entities among a 4G base station, a 5G base station, and an access point, the application processor (AP) 500 may control the modem 400 to enable wireless communication at the lowest power. Accordingly, the application processor (AP) 500 may control the modem 400 and the RFIC 250 to perform short-range communication using only the short-range communication module 113, even at the expense of throughput.

According to another implementation, when a remaining battery capacity of the electronic device is equal to or greater than a threshold value, the application processor 1450 may control the modem 400 to select an optimal wireless interface. For example, the application processor (AP) 500 may control the modem 400 to receive data through both the 4G base station and the 5G base station according to the remaining battery capacity and the available radio resource information. In this case, the application processor (AP) 500 may receive the remaining battery information from the PMIC, and the available radio resource information from the modem 400. Accordingly, when the remaining battery capacity and the available radio resources are sufficient, the application processor (AP) 500 may control the modem 400 and the RFIC 250 to receive data through both the 4G base station and 5G base station.

Meanwhile, in a multi-transceiving system of FIG. 2, a transmitter and a receiver of each radio system may be integrated into a single transceiver. Accordingly, a circuit portion for integrating two types of system signals may be removed from an RF front-end.

Furthermore, since the front end parts can be controlled by an integrated transceiver, the front end parts may be more efficiently integrated than when the transceiving system is separated by communication systems.

In addition, when separated for each communication system, different communication systems cannot be controlled as needed, or because this may lead to a system delay, resources cannot be efficiently allocated. On the other hand, in the multi-transceiving system as illustrated in FIG. 2, different communication systems can be controlled as needed, system delay can be minimized, and resources can be efficiently allocated.

Meanwhile, the first power amplifier 210 and the second power amplifier 220 may operate in at least one of the first and second communication systems. In this regard, when the 5G communication system operates in a 4G band or a Sub 6 band, the first and second power amplifiers 210 and 220 can operate in both the first and second communication systems.

On the other hand, when the 5G communication system operates in a millimeter wave (mmWave) band, one of the first and second power amplifiers 210 and 220 may operate in either the 4G band and the other in the millimeter-wave band.

On the other hand, two different wireless communication systems may be implemented in one antenna by integrating a transceiver and a receiver to implement a two-way antenna. In this case, 4×4 MIMO may be implemented using four antennas as illustrated in FIG. 2. At this time, 4×4 DL MIMO may be performed through downlink (DL).

Meanwhile, when the 5G band is a Sub 6 band, first to fourth antennas ANT1 to ANT4 may be configured to operate in both the 4G band and the 5G band. On the contrary, when the 5G band is a millimeter wave (mmWave) band, the first to fourth antennas (ANT1 to ANT4) may be configured to operate in either one of the 4G band and the 5G band. In this case, when the 5G band is the millimeter wave (mmWave) band, each of the plurality of antennas may be configured as an array antenna in the millimeter wave band.

In some examples, the power and phase controller 230 may control magnitude and/or phase of a signal applied to each of the antennas ANT1 to ANT4. In this regard, the power and phase controller 230 may control the magnitude and/or phase of a signal even when each of the antennas ANT1 to ANT4 operates in a mmWave band. Specifically, the power and phase controller 230 may control the magnitude and/or phase of a signal applied to each antenna element of each of the array antennas ANT1 to ANT4.

Meanwhile, 2×2 MIMO may be implemented using two antennas connected to the first power amplifier 210 and the second power amplifier 220 among the four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented by 1 Tx, only one of the first and second power amplifiers 210 and 220 need to operate in the 5G band. Meanwhile, when the 5G communication system is implemented by 4Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is embedded in RFIC corresponding to the RFIC 250. Accordingly, a separate component does not need to be placed outside, thereby improving component mounting performance. In detail, a transmitter (TX) of two different communication systems can be selected by using a single pole double throw (SPDT) type switch provided in the RFIC corresponding to the controller.

In addition, the electronic device that is operable in the plurality of wireless communication systems according to an embodiment may further include a duplexer 231, a filter 232, and a switch 233.

The duplexer 231 may be configured to separate a signal in a transmission band and a signal in a reception band from each other. In this case, the signal in the transmission band transmitted through the first and second power amplifiers 210 and 220 may be applied to the antennas ANT1 and ANT4 through a first output port of the duplexer 231. On the contrary, signals in a reception band received through the antennas ANT1 and ANT4 are received by the low noise amplifiers 310 and 340 through a second output port of the duplexer 231.

The filter 232 may be configured to pass a signal in a transmission band or a reception band and to block a signal in a remaining band. In this case, the filter 232 may include a transmission filter connected to the first output port of the duplexer 231 and a reception filter connected to the second output port of the duplexer 231. Alternatively, the filter 232 may be configured to pass only the signal in the transmission band or only the signal in the reception band according to a control signal.

The switch 233 may be configured to transmit only one of a transmission signal and a reception signal. In an implementation of the present disclosure, the switch 233 may be configured in a single-pole double-throw (SPDT) form to separate the transmission signal and the reception signal in a time division duplex (TDD) scheme. In this case, the transmission signal and the reception signal may be in the same frequency band, and thus the duplexer 231 may be implemented in a form of a circulator.

Meanwhile, in another implementation of the present disclosure, the switch 233 may also be applied to a frequency division multiplex (FDD) scheme. In this case, the switch 233 may be configured in the form of a double-pole double-throw (DPDT) to connect or block a transmission signal and a reception signal, respectively. On the other hand, since the transmission signal and the reception signal can be separated by the duplexer 231, the switch 233 may not be necessarily required.

Meanwhile, the electronic device according to the present disclosure may further include a modem 400 corresponding to the controller. In this case, the RFIC 250 and the modem 400 may be referred to as a first controller (or a first processor) and a second controller (a second processor), respectively. On the other hand, the RFIC 250 and the modem 400 may be implemented as physically separated circuits. Alternatively, the RFIC 250 and the modem 400 may be logically or functionally distinguished from each other on one physical circuit.

The modem 400 may perform controlling of signal transmission and reception and processing of signals through different communication systems using the RFID 250. The modem 400 may acquire control information from a 4G base station and/or a 5G base station. Here, the control information may be received through a physical downlink control channel (PDCCH), but may not be limited thereto.

The modem 400 may control the RFIC 250 to transmit and/or receive signals through the first communication system and/or the second communication system at specific time and frequency resources. Accordingly, the RFIC 250 may control transmission circuits including the first and second power amplifiers 210 and 220 to transmit a 4G signal or a 5G signal in a specific time interval. In addition, the RFIC 250 may control reception circuits including the first to fourth low noise amplifiers 310 to 340 to receive a 4G signal or a 5G signal at a specific time interval.

Hereinafter, detailed operations and functions of an electronic device having a transparent antenna according to the present disclosure that includes the multi-transceiving system as illustrated in FIG. 2 will be discussed.

In a 5G communication system according to an example, a 5G frequency band may be a higher frequency band than a Sub6 band. For example, the 5G frequency band may be an mmWave band but is not limited thereto, and may be changed depending on applications.

Figure 3:
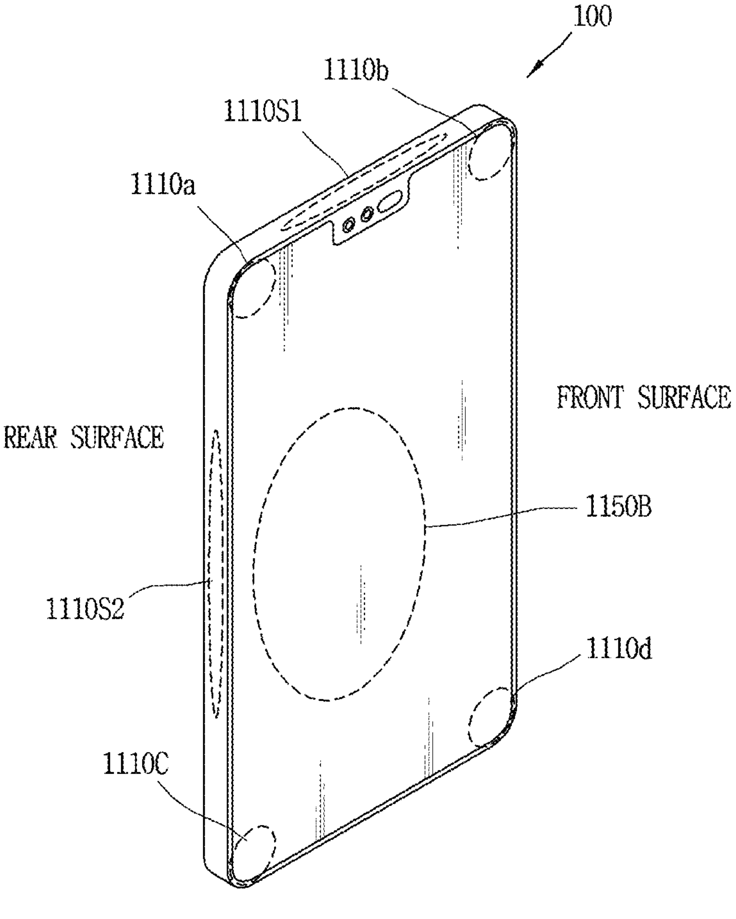
FIG. 3 illustrates an example of a configuration in which a plurality of antennas of the electronic device can be arranged.

FIG. 3 illustrates an exemplary configuration in which a plurality of antennas of the electronic device can be arranged. Referring to FIG. 3, a plurality of antennas 1110*a* to 1110*d* may be arranged on a front surface of the electronic device 100. Here, the plurality of antennas 1110*a* to 1110*d* disposed on the front surface of the electronic device 100 may be implemented as transparent antennas embedded in a display.

A plurality of antennas 1110S1 and 1110S2 may also be disposed on side surfaces of the electronic device 100. Antennas 1150B may additionally be disposed on a rear surface of the electronic device 100.

In some examples, referring to FIG. 2, a plurality of antennas ANT1 to ANT4 may be disposed on the front surface of the electronic device 100. Here, each of the plurality of antennas ANT1 to ANT4 may be configured as an array antenna to perform beamforming in mmWave bands. The plurality of antennas ANT1 to ANT4 configured as single antennas and/or phased array antennas for use of a radio circuit such as the transceiver circuit 250 may be mounted on the electronic device 100.

In some examples, referring to FIGS. 2 and 3, at least one signal may be transmitted or received through the plurality of antennas 1110*a* to 1110*d* corresponding to the plurality of antennas ANT1 to ANT4. In this regard, each of the plurality of antennas 1110*a* to 1110*d* may be configured as an array antenna. The electronic device may perform communication with a base station through any one of the plurality of antennas 1110*a* to 1110*a* to 1110*d*. Alternatively, the electronic device may perform Multi-input/Multi-output (MIMO) communication with the base station through two or more antennas among the plurality of antennas 1110*a* to 1110*d*.

In some examples, at least one signal may be transmitted or received through the plurality of antennas 1110S1 and 1110S2 on the side surfaces of the electronic device 100. On the other hand, at least one signal may be transmitted or received through the plurality of antennas 1110S1 and 1110S4 on the front surface of the electronic device 100. In this regard, each of the plurality of antennas 1110S1 to 1110S4 may be configured as an array antenna. The electronic device may perform communication with a base station through any one of the plurality of antennas 1110S1 to 1110S4. Alternatively, the electronic device may perform Multi-input/Multi-output (MIMO) communication with the base station through two or more antennas among the plurality of antennas 1110S1 to 1110S4.

In some examples, at least one signal may be transmitted or received through the plurality of antennas 1110*a* to 1110*d*, 1150B, and 1110S1 to 1110S4 on the front surface and/or the side surfaces of the electronic device 100. In this regard, each of the plurality of antennas 1110*a* to 1110*d*, 1150B, and 1110S1 to 1110S4 may be configured as an array antenna. The electronic device may perform communication with a base station through any one of the plurality of antennas 1110*a* to 1110*d*, 1150B, and 1110S1 to 1110S4. Alternatively, the electronic device may perform MIMO communication with a base station through two or more antennas among the plurality of antennas 1110*a* to 1110*d*, 1150B, and 1110S1 to 1110S4.

Figure 4A:
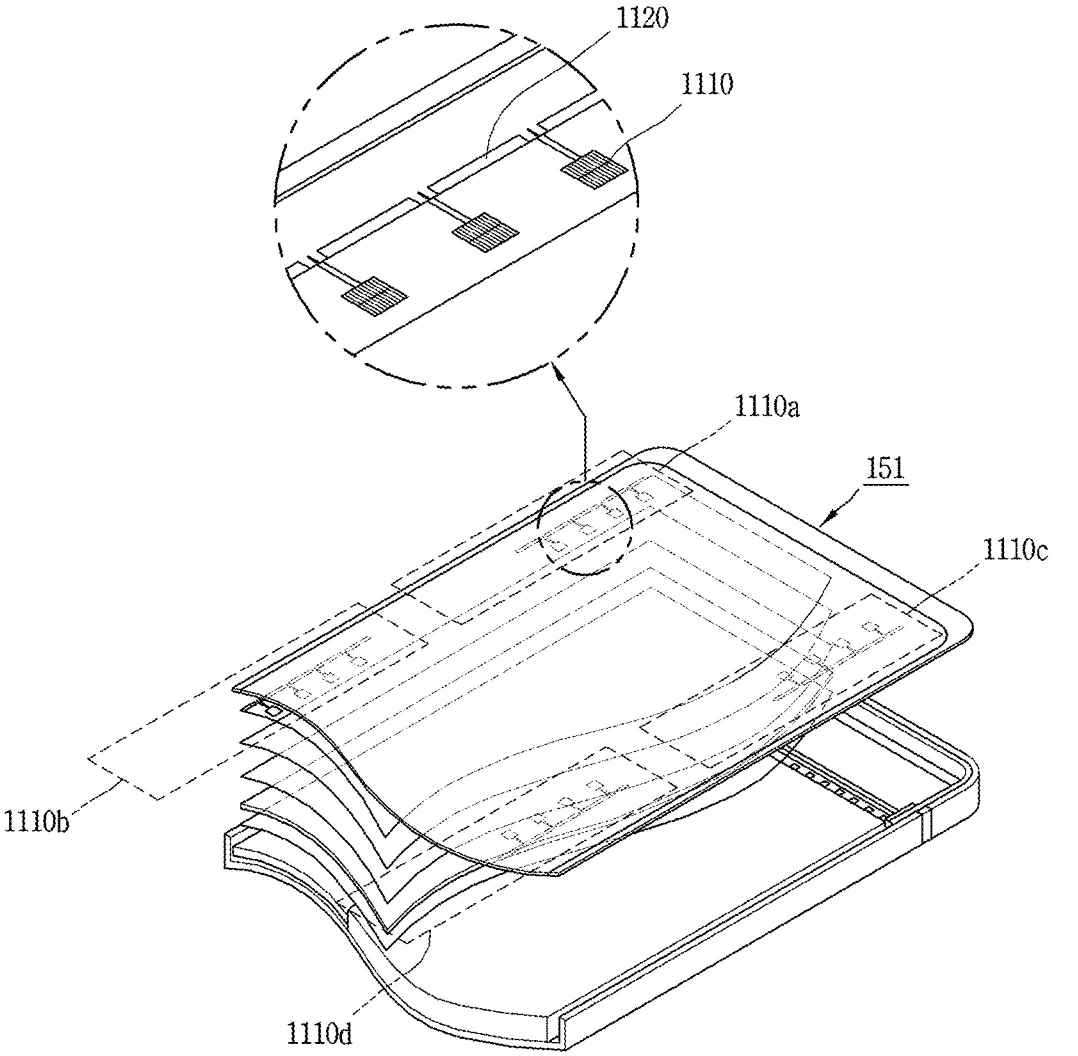
FIG. 4A illustrates an example of an electronic device having a transparent antenna and transmission lines embedded in a display.
Figure 4B:
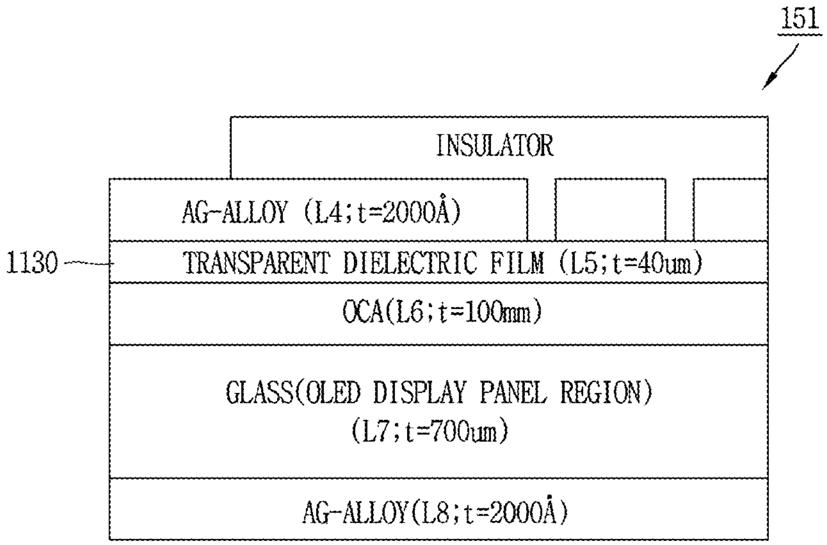
FIG. 4B illustrates a structure of a display in which the transparent antenna is embedded.

Hereinafter, an electronic device having a transparent antenna embedded in a display will be described. FIG. 4A illustrates an electronic device having a transparent antenna and a transmission line disposed in a display in accordance with an example. FIG. 4B illustrates a structure of a display in which the transparent antenna is disposed.

Referring to FIG. 4A, the electronic device may include an antenna 1110 embedded in a display 151 and a transmission line 1120 configured to feed power to the antenna 1110. Here, the display 151 may be configured as an OLED or LCD. In some examples, referring to FIGS. 3 and 4A, the electronic device may include a plurality of antennas ANT1 to ANT4 disposed on the display 151, and a transmission line 1120 to feed the antennas ANT1 to ANT4. Here, each of the plurality of antennas ANT1 to ANT4 may be implemented as an array antenna to perform beamforming. In some examples, array antennas of each of the plurality of antennas 1110*a* to 1110*d* may be spaced apart from one another to perform MIMO. In this regard, spatial beamforming may be performed so that respective beam directions by the plurality of antennas ANT1 to ANT4 are substantially orthogonal to one another.

In this regard, four antenna elements may implement one array antenna as illustrated in FIG. 4A. However, the present disclosure may not be limited thereto, and the array antenna may be implemented as a 2×1, 4×1, or 8×1 array antenna. Also, beamforming may be performed not only in one axial direction, for example, a horizontal direction, but also in another axial direction, for example, a vertical direction. To this end, the array antenna may change to a 2×2, 4×2, 4×4, or 2×4 array antenna. Beamforming can be performed in the mmWave bands using such array antennas.

In some examples, in the electronic device having the transparent antenna, the transparent antenna may operate in the Sub6 band. The transparent antenna operating in the Sub6 band may not be provided in the form of the array antenna. Therefore, the transparent antenna operating in the Sub6 band may be configured such that single antennas are spaced apart from one another to perform MIMO.

Accordingly, instead of the structure in which the patch antennas of FIG. 4A are disposed in the form of an array antenna, patch antennas as single antennas may be disposed at upper left, lower left, upper right, and lower right sides of the electronic device, and each patch antenna may perform MIMO.

Hereinafter, a display structure having transparent antennas therein will be described. Referring to FIG. 4B, a dielectric 1130, that is, a dielectric substrate, may be disposed on an OLED display panel and an OCA inside the display 151. Here, the dielectric 1130 in the form of a film may be used as the dielectric substrate of the antenna 1110. In addition, an antenna layer may be disposed on the dielectric 1130 in the form of the film. Here, the antenna layer may be made of alloy (Ag alloy), copper, aluminum, or the like. In some examples, the antenna 1110 and the transmission line 1120 of FIG. 4A may be disposed on the antenna layer.

Referring to FIGS. 4A and 4B, the transparent antenna may be configured in a structure in which slots are defined inside a patch antenna. In this regard, the transparent antenna of the metal mesh structure may be configured such that a transmission line has a Co-Planar Waveguide (CPW) line structure in order to reduce the loss of the transmission line. In the CPW line structure, a ground around the transmission line may be connected to the patch antenna. Accordingly, a structure in which a slot region of the patch antenna operates as a radiator may be considered.

Figure 5:
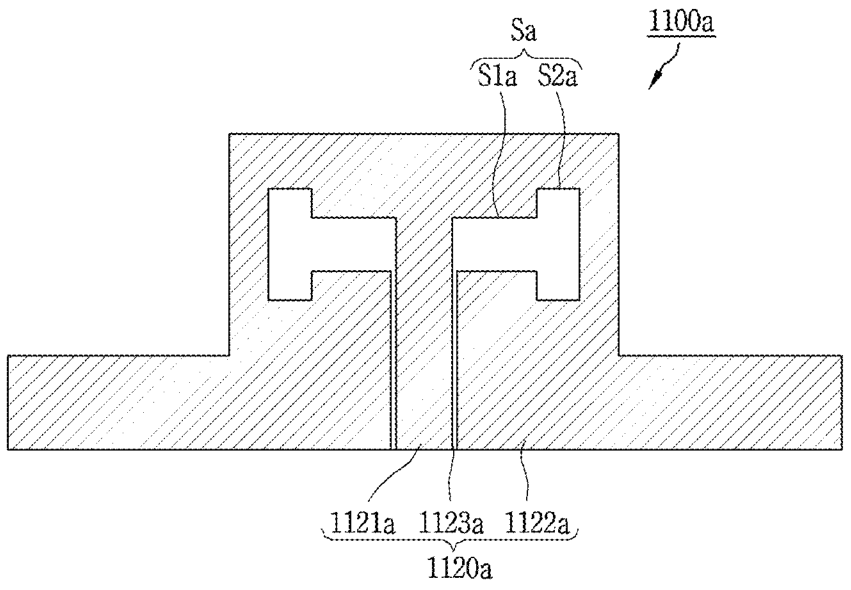
FIG. 5 illustrates an example of a structure in which a CPW transmission line is connected to a patch antenna having a slot region S.

Referring to FIG. 5, a structure in which a CPW transmission line is connected to a patch antenna having a slot region S is illustrated. In this regard, the patch antenna 1100*a* may include therein a slot region Sa including a first slot region Sla and a second slot region S2*a*.

In some examples, the patch antenna 1100*a* may be connected to a transmission line 1120*a* having a CPW line structure. In addition, the transmission line 1120*a* having the CPW line structure may be connected to the first slot region S1*a*, so that an electric field is produced at the slot region Sa and a signal is radiated accordingly. In addition, the transmission line 1120*a* having the CPW line structure may be connected to the patch antenna 1100*a* so that the patch antenna 1100*a* can operate as a ground.

Figure 6:
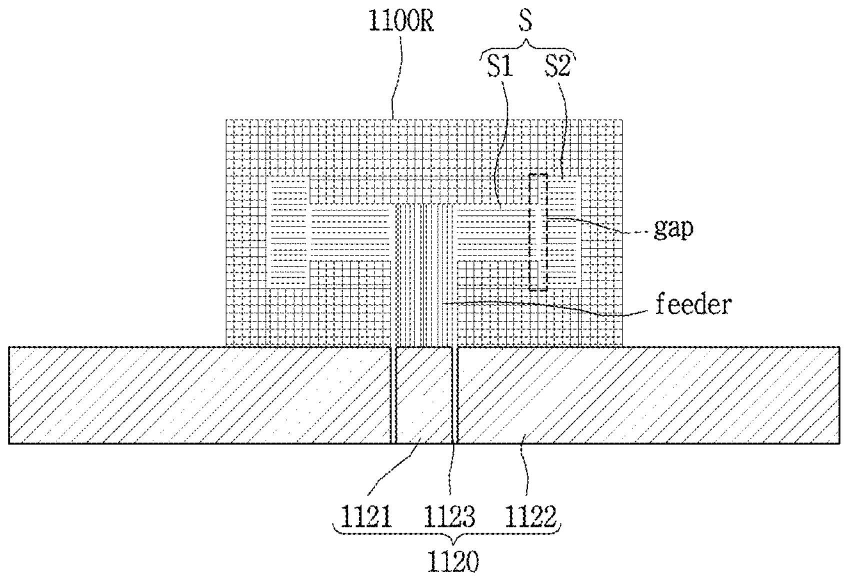
FIG. 6 is a view illustrating a configuration of an antenna having slots in a metal mesh structure in accordance with one implementation.

Hereinafter, an antenna having a slot of a metal mesh structure according to one implementation will be described. FIG. 6 is a view illustrating a configuration of an antenna having slots in a metal mesh structure in accordance with one implementation.

In this regard, technical features of an antenna having slots of a metal mesh structure will be described as follows.

1) A feeding line feeds a slot antenna across the slot antenna through a CPW line.

2) A radiator is connected to a ground and is implemented as a square mesh. In this regard, the radiator may be designed to have transparency of 95%, which may vary depending on an application.

3) A dummy mesh line is formed on an outside of the radiator in an orthogonal direction to an E-field direction. Accordingly, the dummy mesh lines may be arranged at intervals maintaining the same transparency of 95%. In the implementation, the interval between the metal mesh lines is set to 100 um, but this may vary according to an application.

4) The mesh line is disposed at each slot within the radiator to be orthogonal to an E-field direction. In addition, in order to prevent performance reduction due to self-resonance, the metal mesh line may be designed as a line with a size less than ½ of an effective wavelength (Effective Lambda).

Referring to FIG. 6, an example of a structure in which a CPW transmission line is connected to a patch antenna in a metal mesh structure having a slot region S is illustrated. In this regard, the patch antenna 1100 may include therein a slot region S including a first slot region S1 and a second slot region S2.

In some examples, the patch antenna 1100 may be connected to a transmission line 1120 having a CPW line structure. In addition, the transmission line 1120 having the CPW line structure may be connected to the first slot region S1, so that an electric field is produced at the slot region S and a signal is radiated accordingly. In addition, the transmission line 1120 having the CPW line structure may be connected to the patch antenna 1100 so that the patch antenna 1100 can operate as a ground.

Accordingly, the antenna 1100 of the metal mesh structure may operate in a state of being embedded in the display. Therefore, the antenna 1100 having the metal mesh structure can radiate a 5G radio signal transmitted from the transmission line 1120. Here, the 5G radio signal may be a 5G radio signal of a Sub 6 band or a 5G radio signal of a millimeter wave (mmWave) band.

In some examples, the antenna 1100 of the metal mesh structure may include a feeder and a slot region S. Here, the feeder may be implemented as a transmission line having a CPW line structure, and may be disposed inside the antenna 1100. Accordingly, as an end portion of the transmission line 1120, a portion disposed inside the antenna 1100 may be referred to as a feeder.

The feeder may include metal mesh lines that are connected to the transmission line 1120 and disposed in parallel to a boundary of the transmission line 1120. In other words, the feeder may include metal mesh lines arranged parallel to the boundary of the feeder. In some examples, the feeder may include therein metal mesh lines that are arranged only in one axial direction, that is, in a y-axial direction. The feeder may also include therein orthogonal metal mesh lines that are arranged in another axial direction, that is, in an x-axial direction at a predetermined interval of half-wavelength or quarter-wavelength. Referring to FIG. 6, when a feeder is implemented with a wavelength of less than quarter-wavelength, the orthogonal metal mesh lines orthogonal to the metal mesh lines may not be disposed.

On the other hand, the slot region S refers to a dielectric region from which metal patterns are removed. However, the slot region S1 of the metal mesh structure according to the one implementation may include orthogonal metal mesh lines that are disposed in a direction substantially orthogonal to the metal mesh lines of the feeder. In other words, the slot region S may be defined inside the antenna 1100 and may include the orthogonal metal mesh lines disposed to be orthogonal to the metal mesh lines of the feeder. Therefore, the metal mesh lines may not be removed from the slot region of the antenna including the metal mesh lines but may be disposed in a direction orthogonal to the feeder. That is, the present disclosure can have an orthogonal arrangement structure in which the metal mesh lines are arranged to be orthogonal to an electric field of the feeder.

In this regard, an electric field may be strongly distributed at a boundary between the slot antenna and a region around the slot. Therefore, the mesh lines may not be removed from the slot region, which can suppress an electric field from being reduced at the slot region.

In some examples, the slot region S may include a first slot region S1 and a second slot region S2 connected to the first slot region S1. The first slot region S1 may include orthogonal metal mesh lines disposed to be orthogonal to the metal mesh lines of the feeder.

The second slot region S2 may also include orthogonal metal mesh lines formed in a similar manner to the first slot region S1. The second slot region S2 may include a slot having a width different from that of the first slot region S1. In some examples, the second slot region S2 may be separated from the orthogonal metal mesh line of the first slot region S1 in the slot by a gap. Accordingly, the second slot region S2 may include second orthogonal metal mesh lines that are parallel to the orthogonal metal mesh lines arranged in the first slot region S1 and are separated from those metal mesh lines by the gap.

In some examples, the antenna 1100 may further include a radiator region 1100R that includes square mesh lines to radiate a signal transmitted from the feeder. In some examples, the square mesh lines included in the radiator region 1100R may be arranged at predetermined intervals. However, since the electric field distribution is strong around the first slot region S1 and the second slot region S2, square mesh lines formed at finer intervals may be disposed.

Figure 7:
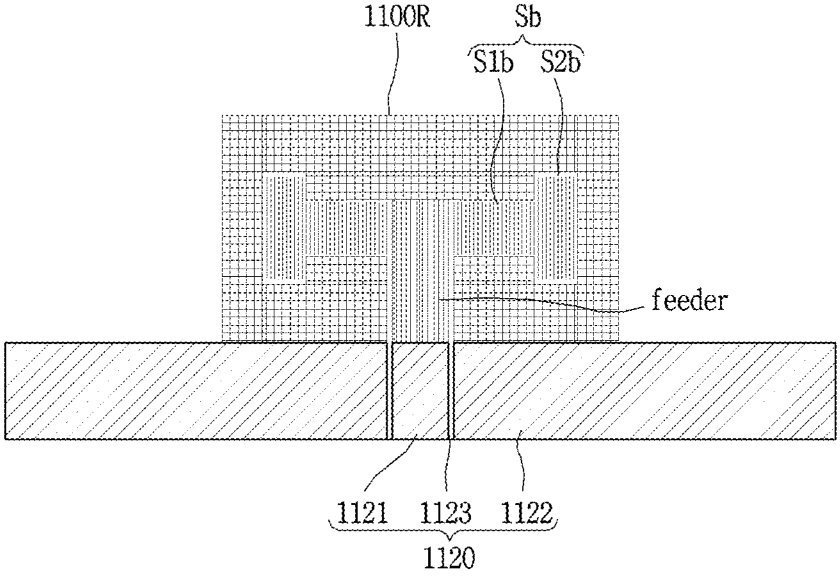
FIG. 7 illustrates an example of a parallel arrangement structure disposed at a slot region to be parallel with a boundary of a feeder.

In some examples, a parallel arrangement structure in which the slot region of the slot antenna having the metal mesh lines is arranged in a direction parallel to the electric field of the feeder may be considered. FIG. 7 illustrates an example of a parallel arrangement structure disposed at a slot region to be parallel with a boundary line of a feeder.

Referring to FIG. 7, a slot region Sb may be defined inside the antenna 1100 and may include parallel metal mesh lines disposed in a direction parallel to the metal mesh lines. In the parallel arrangement structure having the parallel metal mesh lines as illustrated in FIG. 7, there is a problem in that intensity of an electric field in the slot region Sb may be significantly decreased. In this regard, in the antenna implemented with the plurality of metal mesh lines, the radiator region 1100R and the slot region Sb have similar mesh structures although they are separated by the gap. This causes a problem in that the radiator region and the slot region having the similar mesh structures are not clearly distinguished from each other in the aspect of an electric field by a 5G radio signal.

Figure 8A:
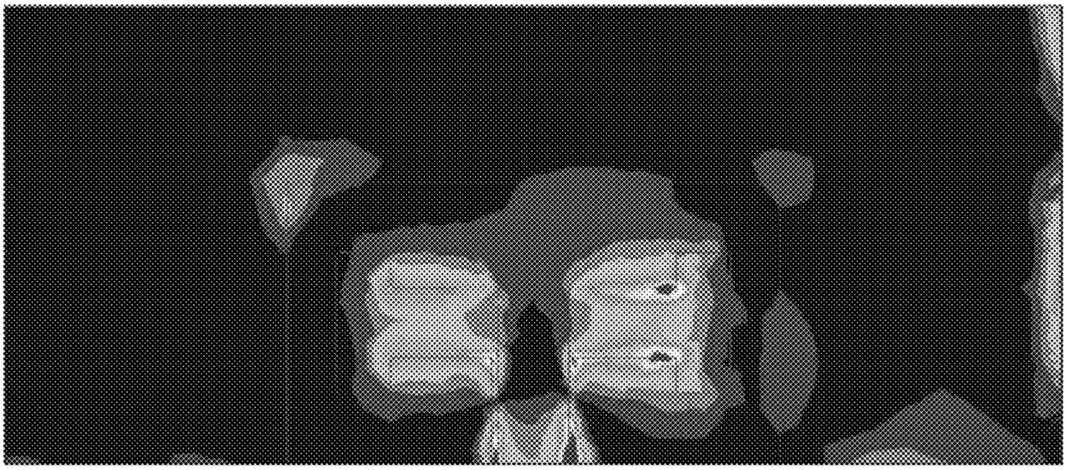
FIG. 8A illustrates an example of an electric field distribution of a slot patch antenna having a CPW feeding structure including metal patterns.
Figure 8B:
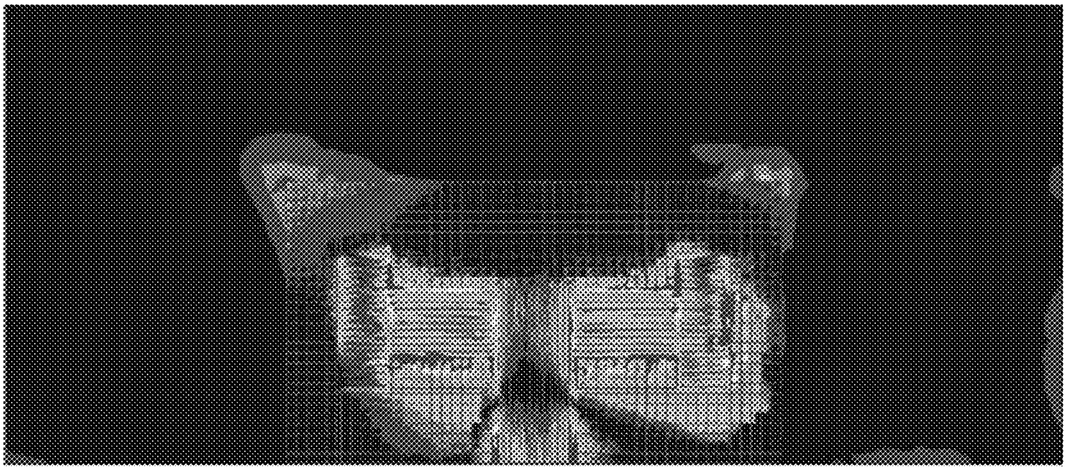
FIG. 8B illustrates an example of an electric field distribution of an antenna having a metal mesh structure with slots of an orthogonal arrangement structure.
Figure 8C:
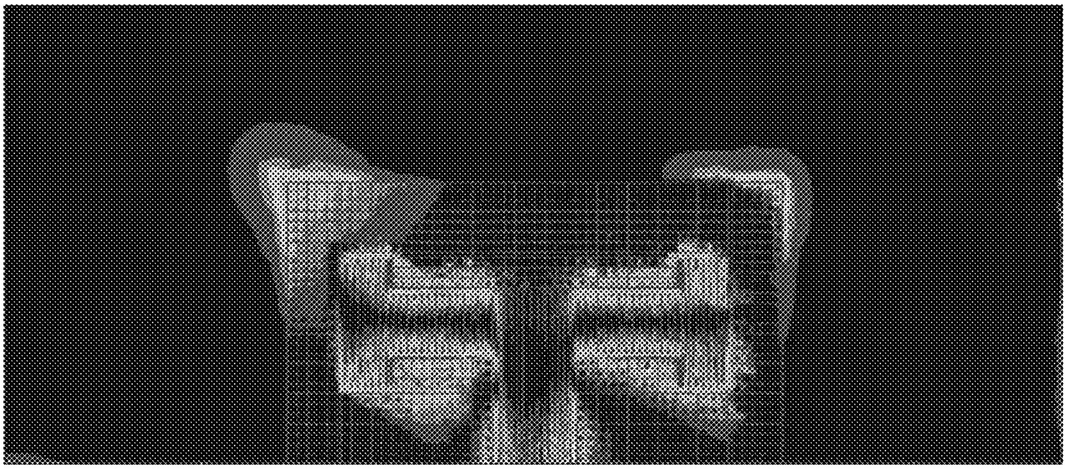
FIG. 8C illustrates an example of an electric field distribution of an antenna having a metal mesh structure with slots disposed to be parallel with each other.

Hereinafter, comparison results of the characteristics of a CPW feeding structure antenna having metal patterns (FIG. 5), a metal mesh structure antenna having slots of an orthogonal arrangement structure (FIG. 6), and a metal mesh structure antenna having slots of a parallel arrangement structure (FIG. 7) will be described. FIG. 8A illustrates an example of an electric field distribution of a slot patch antenna having a CPW feeding structure including metal patterns. FIG. 8B illustrates an example of an electric field distribution of an antenna having a metal mesh structure with slots of an orthogonal arrangement structure. FIG. 8C illustrates an example of an electric field distribution of an antenna having a metal mesh structure with slots of a parallel arrangement structure.

Referring to FIGS. 8A and 8B, when the metal mesh lines are orthogonally disposed at the slot region, it can be seen that the electric field is evenly distributed in the slot region similar to a slot region from which metal patterns are removed. However, referring to FIG. 8C, when the metal mesh lines are arranged in parallel at the slot region, it can be seen that the intensity of the electric field is significantly reduced compared to the case where the metal mesh lines are arranged orthogonally. Therefore, referring to FIGS. 7 and 8C, there is a problem in that the intensity of the electric field in the slot region Sb can be significantly reduced in the parallel arrangement structure having the parallel metal mesh lines. In this regard, in the antenna implemented with the plurality of metal mesh lines, the radiator region 1100R and the slot region Sb have similar mesh structures although they are separated by the gap. This causes a problem in that the radiator region and the slot region having the similar mesh structures are not clearly distinguished from each other in the aspect of an electric field by a 5G radio signal.

On the other hand, as illustrated in FIGS. 6 and 8B, it can be seen that the electric field is not reduced in the slot region S in the orthogonal arrangement structure in which the metal mesh lines in the slot region S are arranged to be orthogonal to the electric field of the feeder. In particular, it can be seen that the electric field is strongly distributed at the boundary between the slot antenna and a region around the slot. This can prevent a reduction of the electric field in the slot region S without removing the mesh lines from the slot region. In detail, the mesh lines may be arranged in the slot region S to be orthogonal to the mesh lines of the feeder. Accordingly, from the perspective of the electric field by the 5G radio signal, the radiator region 1100R and the slot region S can be clearly distinguished.

Figure 9:
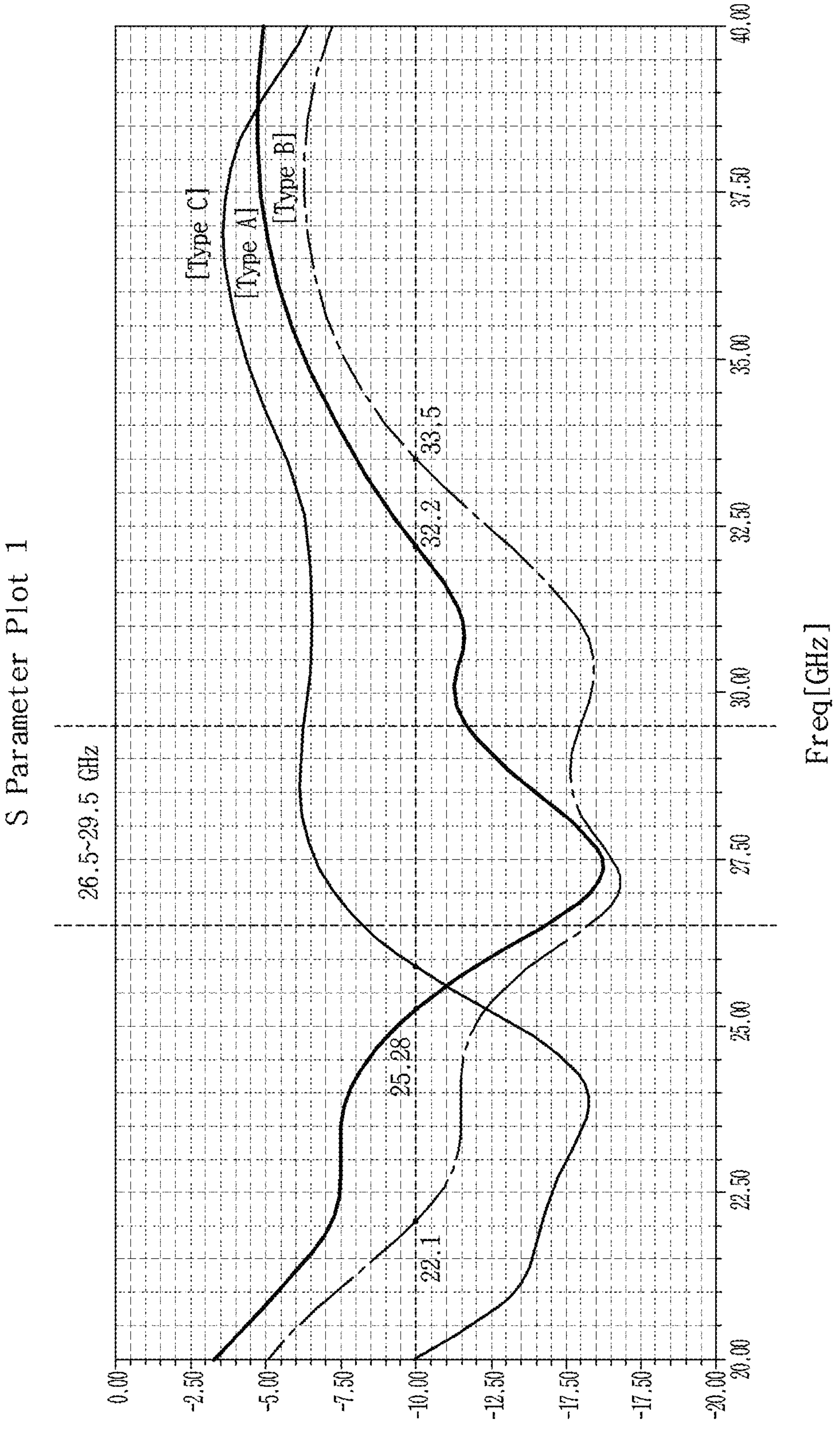
FIG. 9 illustrates a comparison result of reflection coefficient characteristics of a slot antenna structure (Type A) including metal patterns, a slot antenna structure (Type B) including orthogonally-disposed metal mesh lines, and a slot antenna structure (Type C) including metal mesh lines disposed in parallel.

In this regard, the reflection coefficient characteristics and antenna gains of the slot patch antennas illustrated in FIGS. 5 to 7 will be compared as follows. Specifically, FIG. 9 compares reflection coefficient characteristics in the slot antenna structures of FIGS. 5 to 7. In detail, FIG. 9 illustrates a comparison result of reflection coefficient characteristics of a slot antenna structure (Type A) including metal patterns, a slot antenna structure (Type B) including orthogonally-disposed metal mesh lines, and a slot antenna structure (Type C) including metal mesh lines disposed in parallel.

Referring to FIG. 9, it can be seen that a shift of an operating frequency does not occur in the slot antenna of Type B compared to the ideal slot antenna of Type A. On the other hand, it can be seen that an operating frequency of the slot antenna of Type C as a control group is shifted greatly compared to the ideal slot antenna of Type A.

On the other hand, the slot antenna of Type B exhibits wideband characteristics that a reflection coefficient bandwidth is increased by 65.6%, rather than the ideal slot antenna of Type A. Referring to Table 1, the gain of the slot antenna of Type B is improved by about 1 dB compared to the slot antenna of Type C. Antenna efficiency (radiation efficiency) of the slot antenna of Type B is improved by about 48%, from about 49.8% to 73.9%, compared to the slot antenna of Type C.

These wideband characteristics can be obtained because a drastic change in electric field due to discontinuity at a slot boundary is prevented by the mesh lines orthogonally disposed in the slot. In addition, the wideband characteristics can be obtained because the radiator region and the slot region are clearly distinguished by the mesh lines orthogonally arranged in the slot from the perspective of the electric field by the 5G radio signal.

In relation to the aforementioned, Table 1 shows the gain characteristics and radiation efficiencies of the slot antennas of Type A to Type C. Referring to Table 1, the ideal slot antenna of Type A having the metal patterns exhibits the highest radiation efficiency and antenna gain. However, the slot antenna of Type B having the metal mesh structure also exhibits similar radiation efficiency and antenna gain. The radiation efficiency relates to conductivity. Therefore, the antenna of the metal mesh structure exhibits lower efficiency than the antenna of Type A having the metal patterns that the inside of the antenna is fully filled with metal patterns. In some examples, if a distance between the metal mesh lines is reduced to increase efficiency in the antenna having the metal mesh structure, transparency may be reduced by the metal mesh lines.

On the other hand, the slot antenna of Type C in which the metal mesh lines are arranged in parallel has low antenna gain and low radiation efficiency.

TABLE 1

| | Type A having metal pattern structure | Type B having orthogonal arrangement structure | Type C having parallel arrangement structure |
|---|---|---|---|
| Antenna gain | 5 dBi | 3.8 dBi | 2.8 dBi |
| Radiation Efficiency | 90.5% | 73.9% | 49.8% |

In some examples, dummy metal lines may be disposed in a dielectric region around the radiator region 1100R. This can provide an advantage in that visibility is improved by the dummy metal lines disposed in the dielectric region. Specifically, in a transparent antenna having a metal mesh structure, when metal mesh lines are not disposed in a dielectric region around the antenna, there is a problem in that a metal region and a non-metal region are visually distinguished. Accordingly, when a metal pattern such as an antenna is disposed inside the display, transparency of the display is not uniform for each region.

In order to solve this problem, in the transparent antenna having the metal mesh structure, the dummy metal lines may preferably be disposed in the dielectric region around the antenna. The dummy metal lines disposed in the dielectric region around the antenna can increase an effective antenna area, so as to enhance the antenna gain. In this regard, the effective antenna area may be increased by a fringing field in the patch antenna filled with the metal patterns. On the other hand, a small fringing field appears in the transparent antenna having the metal mesh lines. To compensate for this, dummy metal lines may be disposed in a peripheral region of the transparent antenna having the metal mesh lines. The dummy metal lines disposed in the peripheral region of the transparent antenna having the metal mesh lines can increase the effective antenna area.

Figure 10A:
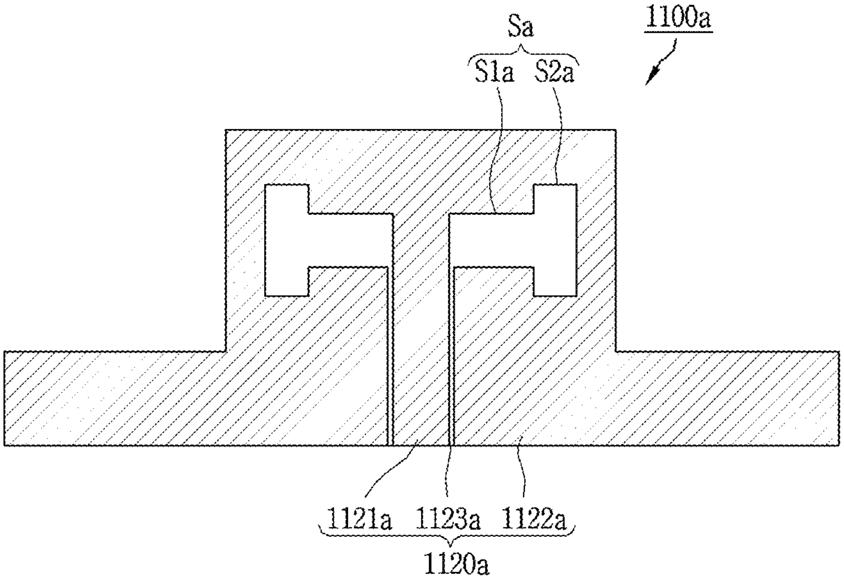
FIGS. 10A to 10C illustrate an example of a configuration according to presence or absence of dummy patterns and a shape of the dummy patterns in a slot antenna.
Figure 10B:
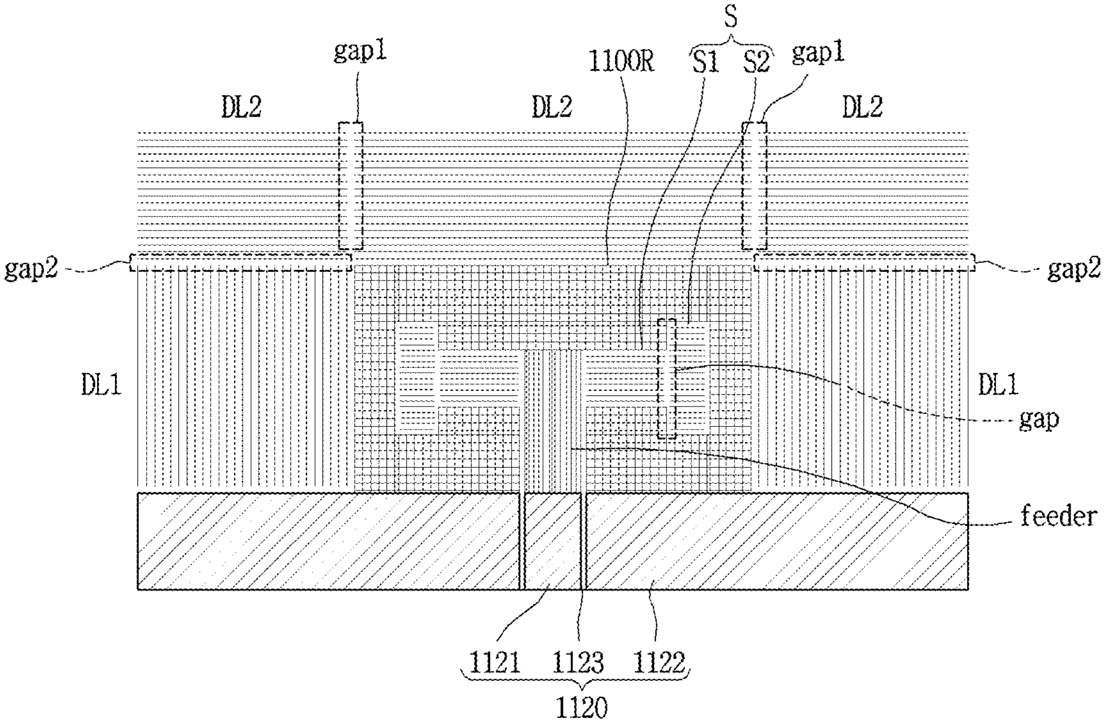
Figure 10C:
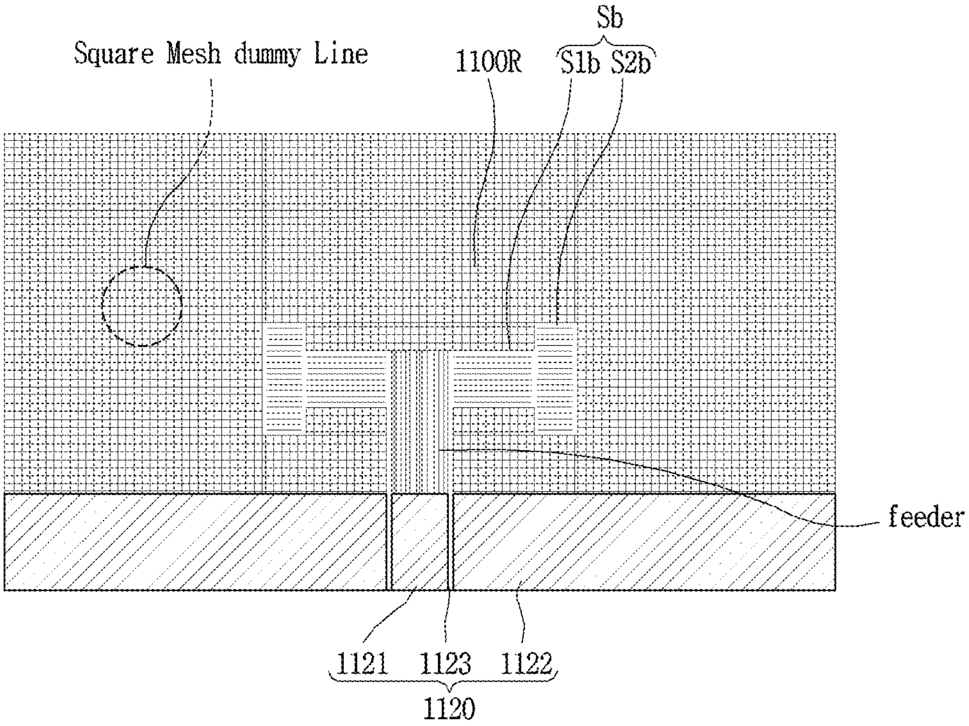

FIGS. 10A to 10C illustrate an example of a configuration according to presence or absence of dummy patterns and a shape of the dummy patterns in a slot antenna. Specifically, FIG. 10A corresponds to a slot antenna structure filled with metal patterns as illustrated in FIG. 5. FIG. 10B corresponds to a structure in which dummy patterns are disposed in a region adjacent to the radiator region 1100R to be orthogonal to the mesh lines of the slot region S in the slot antenna of Type B of FIG. 6. FIG. 10C corresponds to a structure in which dummy patterns are arranged into a square shape, which is the same as the mesh lines inside the radiator 1100R, in the region adjacent to the radiator region 1100R in the slot antenna of Type B of FIG. 6.

Referring to FIG. 10B, the electronic device having the slot antenna of Type B may further include first dummy metal lines DL1 and second dummy metal lines DL2 orthogonal to the first dummy metal lines DL1.

Specifically, the first dummy metal lines DL1 may be disposed at one region and another region both adjacent to the radiator region 1100R. In other words, the first dummy metal lines DL1 may be disposed at a left region and a right region both adjacent to the radiator region 1100R. Accordingly, the first dummy metal lines DL1 may be parallel to the metal mesh lines of the feeder and orthogonal to the orthogonal metal mesh lines of the slot region S.

On the other hand, the second dummy metal lines DL2 orthogonal to the first dummy metal lines DL1 may be disposed at an upper region adjacent to the radiator region 1100R. Accordingly, the second dummy metal lines DL2 may be orthogonal to the metal mesh lines of the feeder and parallel to the orthogonal metal mesh lines of the slot region S.

In some examples, the dummy metal lines DL1 and DL2 may not be connected to each other, to prevent interference therebetween. In this regard, a gap between the dummy metal lines DL1 and DL2 may be a predetermined gap or more in units of wavelengths in consideration of an operating frequency. Accordingly, the second dummy metal lines DL2 may be spaced apart from each other by a first gap gap1. Specifically, the first gap may be defined between the second dummy metal lines disposed at left and right regions of an upper region and the second dummy metal lines disposed at a central region of the upper region. The gap defined between the second dummy metal lines can prevent a generation of surface current on a dielectric substrate.

Meanwhile, an electrical length of the second dummy metal lines DL2 disposed at the central region of the upper region may be a substantially half-wavelength of an operating frequency. Accordingly, the second dummy metal lines of the half-wavelength disposed at the central region can be prevented from interfering with the second dummy metal lines disposed at the left and right regions. In addition, a length of one side of the radiator region 1100R may be a substantially half-wavelength, and a length of one side of the slot region S2 may be shorter than the half-wavelength. Accordingly, the second dummy metal lines DL2 can be disposed adjacent to the radiator region 1100R to improve visibility, and the interference among the second dummy metal lines DL2 can be reduced by the length corresponding to the half-wavelength.

In some examples, when the length of the one side of the slot region S2 is the substantially half-wavelength, the length of the one side of the radiator region 1100R may be substantially slightly longer than the half-wavelength. In this case, when the length of the radiator region 1100R is longer than the half-wavelength, the orthogonal lines OL may be added to the radiator region 1100R and the dummy region at a predetermined interval, that is, half-wavelength or quarter-wavelength.

The first dummy metal lines DL1 and the second dummy metal lines DL2 may be orthogonal to each other. Also, a second gap gap2 may be defined between the first dummy metal lines DL1 and the second dummy metal lines DL2. The second gap gap2 defined between the first dummy metal lines DL1 and the second dummy metal lines DL2 can prevent the generation of the surface current on the dielectric substrate.

The first dummy metal lines DL1 as illustrated in FIG. 10B may be disposed to be orthogonal to the metal lines of the feeder. In addition, the second dummy metal lines DL2 may be disposed to be orthogonal to the metal lines of the slot region S. Accordingly, the first dummy metal lines DL1 can be disposed to be orthogonal to the feeder, so as to prevent an introduction of an electric field from the feeder. Also, the second dummy metal lines DL2 can be disposed to be orthogonal to the slot region S, so as to prevent an introduction of an electric field from the slot region S.

Figure 11A:
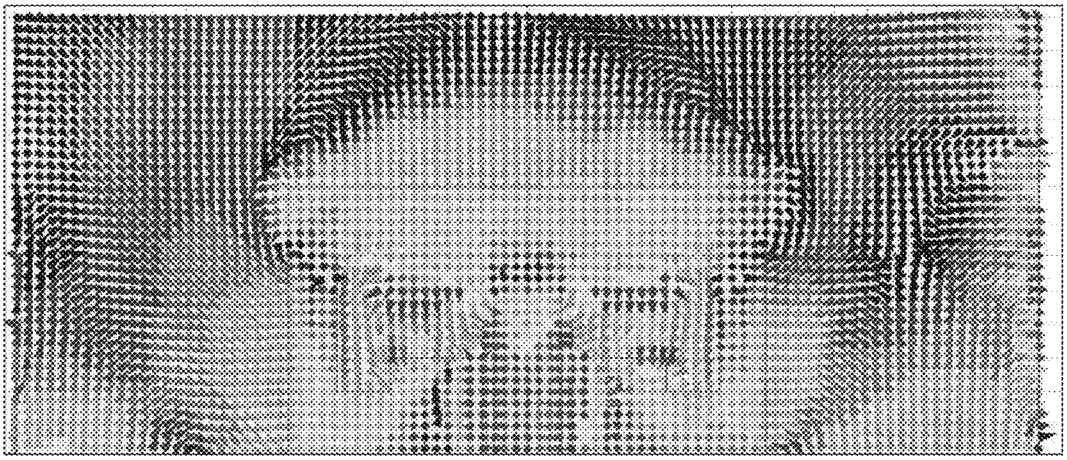
FIGS. 11A to 11C illustrate an example of a current distribution according to presence or absence of dummy metal lines and a shape of the dummy metal lines.
Figure 11B:
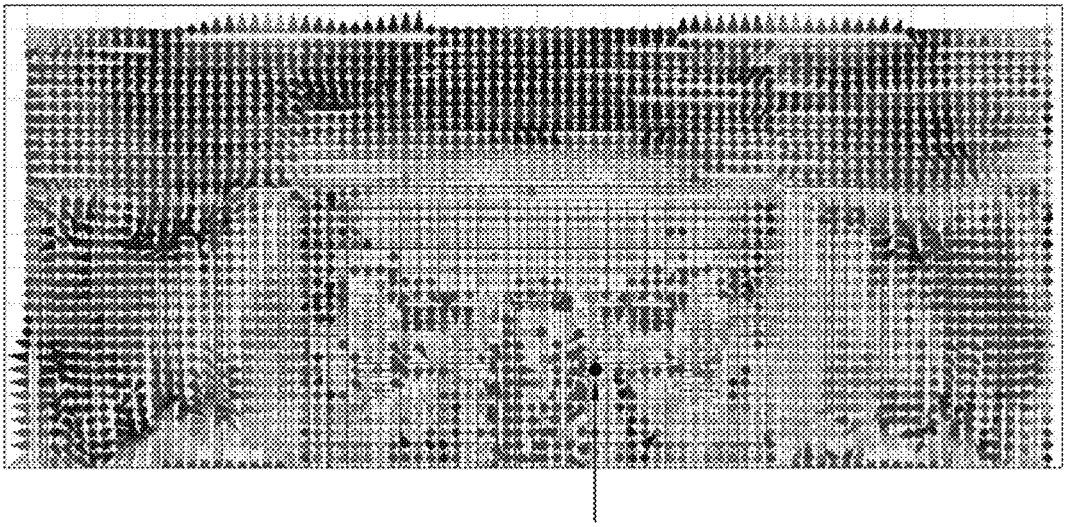
Figure 11C:
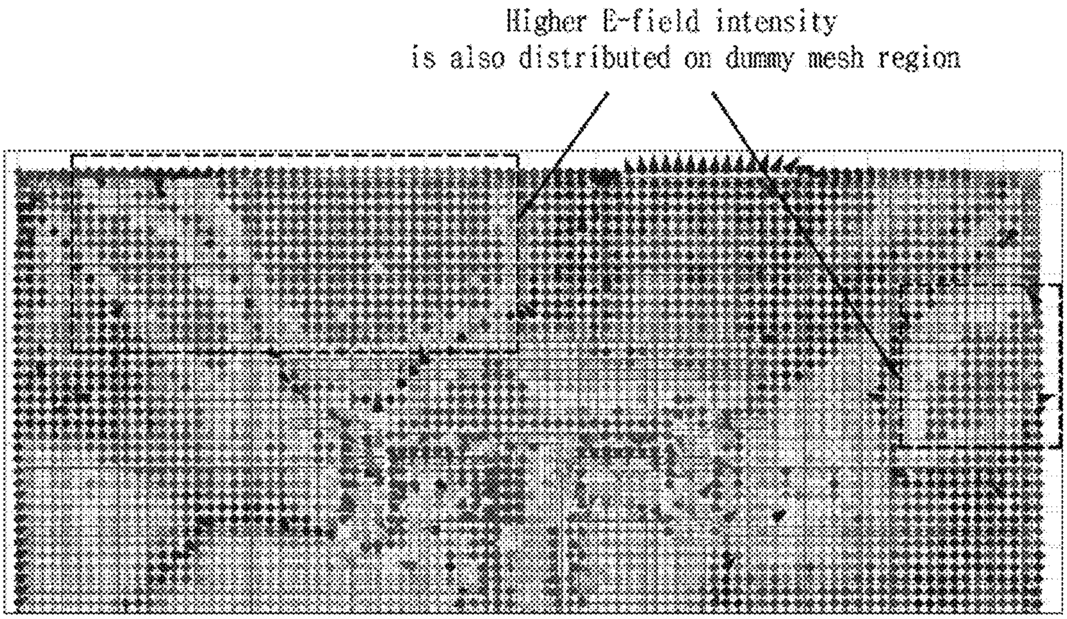

FIGS. 11A to 11C illustrate an example of a current distribution according to presence or absence of dummy metal lines and a shape of the dummy metal lines. In detail, FIG. 11A illustrates a current distribution in the antenna structure of Type A filled with the metal patterns without dummy metal lines. FIG. 11B illustrates a current distribution when the dummy metal lines are disposed orthogonally on the feeder and the slot region. FIG. 11C illustrates a current distribution when the dummy metal lines having the square structure similar to those on the radiator region are disposed.

Referring to FIGS. 11A and 11B, it can be seen that an electric field with high intensity is distributed on the feeder and the slot region when the dummy metal lines are disposed orthogonally. The dummy metal lines that are orthogonally disposed can prevent the current from flowing to the outside of the radiator region, which may result in increasing radiation efficiency.

On the other hand, referring to FIGS. 11B and 11C, for the dummy metal lines arranged in the square structure similar to those arranged in the radiator region, an electric field produced on the feeder and the slot region is introduced even into the region where the dummy metal lines are arranged.

This may cause surface current to be generated even on the region having the dummy metal lines, thereby causing a reduction of radiation efficiency. In other words, referring to FIG. 11C, for the dummy metal lines having the square structure, the electric field with the high intensity is also distributed in the region where the dummy metal lines are disposed, that is, in a dummy mesh region. It can also be seen that direction and intensity of the electric field are greatly distorted even on the CPW line and the slot region of FIG. 11C, compared to that of FIG. 11B. On the other hand, referring to FIG. 11B, it can be seen that the current distribution and the electric field intensity are similar to those of the ideal case as illustrated in FIG. 11A on all of the CPW line, the slot region, and the dummy mesh region.

Figure 12:
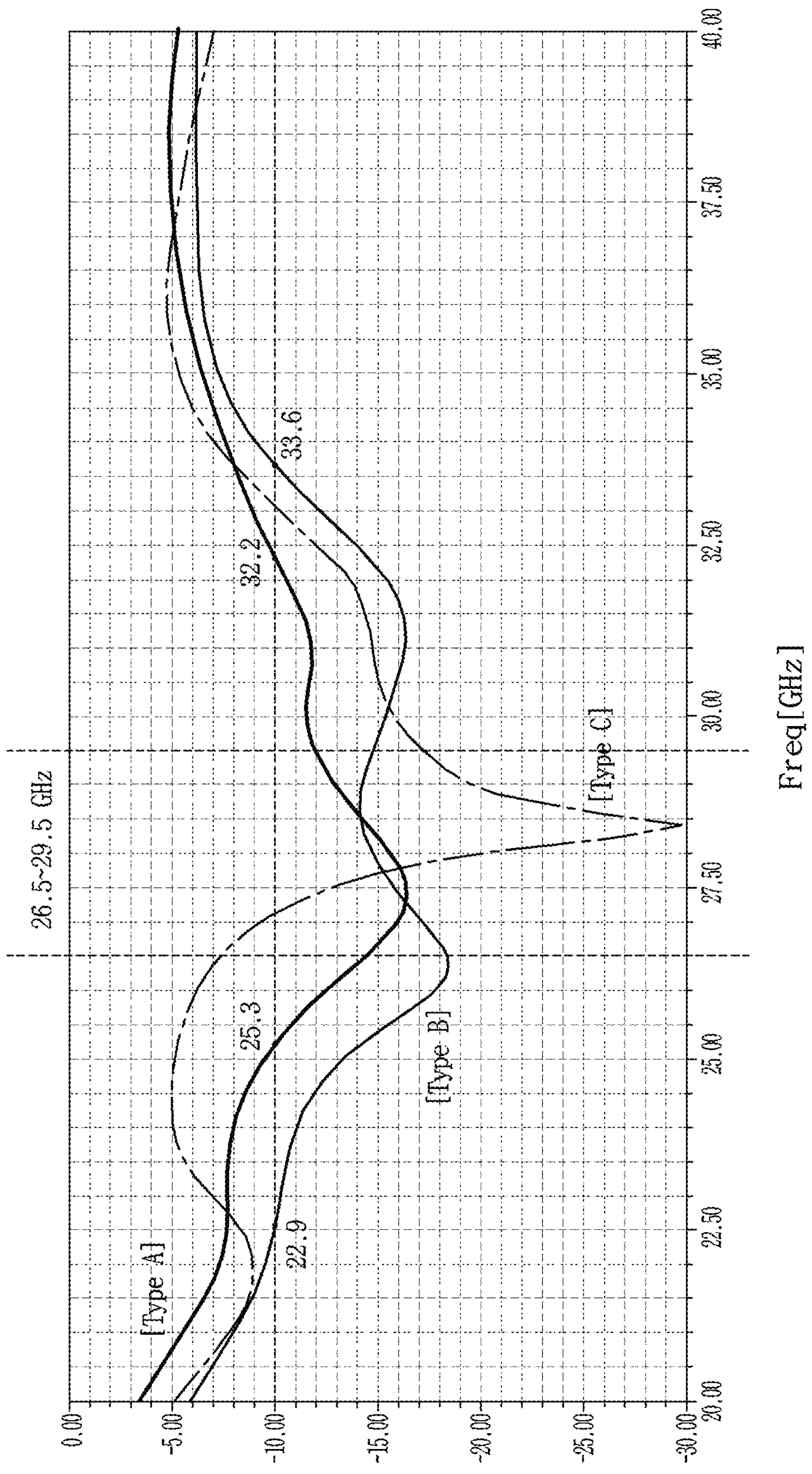
FIG. 12 illustrates an example of reflection coefficient results according to presence or absence of dummy patterns and a shape of the dummy patterns.

FIG. 12 illustrates an example of reflection coefficient results according to presence or absence of dummy patterns and a shape of the dummy patterns. Here, Type A, Type B, and Type C represent the metal mesh antenna structures of FIGS. 10A, 10B, and 10C, respectively. In detail, Type A is the ideal slot antenna structure having the radiator region fully filled with the metal patterns and the slot region from which the metal patterns are removed. Type B is the slot antenna structure having the dummy metal lines disposed to be orthogonal to the metal mesh lines disposed in the feeder and the slot region. Type C is the slot antenna structure having the dummy metal lines arranged into the square structure similar to the metal mesh lines in the radiator region.

Referring to FIG. 12, Type B does not cause the shift of the operating frequency, compared to Type A. Type B exhibits the characteristic that a bandwidth is increased by about 55%, compared to Type A. This wideband characteristic can be obtained because a drastic change in electric field due to discontinuity at a slot boundary is prevented by the mesh lines orthogonally disposed in the slot. In addition, this wideband characteristic can be obtained because the radiator region and the slot region are clearly separated by the mesh lines orthogonally arranged in the slot from the perspective of the electric field by the 5G radio signal.

Type B exhibits the antenna gain improved by about 2.1 dB, compared to Type C. In addition, Type B exhibits the antenna efficiency improved by about 83.9%, from about 39.2% to about 72.1%, compared to Type C. As described above, the antenna gains and radiation efficiencies (antenna efficiencies) of Type A to Type C are shown in Table 2.

TABLE 2

| | Type A having metal pattern structure | Type B having orthogonal arrangement structure | Type C having parallel arrangement structure |
|---|---|---|---|
| Antenna gain | 5 dBi | 4.6 dBi | 2.5 dBi |
| Radiation Efficiency | 90.5% | 72.1% | 39.2% |

In some examples, referring to FIGS. 5 to 7 and FIGS. 10A to 10C, the transmission line 1120 may be implemented as the CPW line structure for a low-loss transmission line. In this regard, the transmission line 1120 (1120*a* in FIGS. 5 and 10A) may include an inner conductor region 1121 (1121*a* in FIGS. 5 and 10A), an outer conductor region 1122 (1122*a* in FIGS. 5 and 10A), and a dielectric region 1123 (1123*a* in FIGS. 5 and 10A). The inner conductor region 1121 may operate as a signal line and the outer conductor region 1122 may operate as a ground. The dielectric region 1123 may be located between the inner conductor region 1121 and the outer conductor region 1122.

For such a CPW line, the inner conductor region 1121 and the outer conductor region 1122 may be referred to as a strip line 1121 and a ground 1122, respectively. Referring to FIGS. 5 to 7 and FIGS. 10A to 10C, the transmission line 1120 of the CPW line structure may be implemented as a printed metal pattern on a dielectric, so as to form a non-transparent region. On the other hand, the antenna 1110 having the metal mesh lines may be disposed on the dielectric, so as to form a transparent region.

In this regard, when the transparent region and the non-transparent region are disposed on the same layer inside the display, transparency may be 0 in the non-transparent region, thereby lowering overall visibility. On the other hand, when the transparent region and the non-transparent region are disposed on the same layer inside the display, any problem does not occur in view of the transparency and visibility of the display as long as the non-transparent region is formed on a bezel portion. Accordingly, when the transmission line 1120 of the CPW line structure is filled with the metal patterns, the transmission line 1120 may be disposed on the bezel portion of the non-transparent region.

Alternatively, the antenna 1110 at the transparent region and the transmission line 1120 at the non-transparent region may be disposed on dielectrics of different layers. As such, the transparency and visibility issues may be somewhat resolved by the transparent and non-transparent regions disposed on the dielectrics of the different layers. Therefore, the antenna 1110 having the metal mesh structure and the transmission line 1120 having the metal pattern structure may be disposed on the dielectrics of the different layers. To this end, the CPW line 1120 may be disposed below the antenna 1110 and a signal transmitted through the CPW line 1120 may be radiated through the slot region S1 of the antenna 1110.

Meanwhile, the transmission line 1120 of the CPW line structure in FIGS. 5 to 7 and FIGS. 10A to 10C may not be limited to a solid structure filled with metal patterns. In this regard, the transmission line 1120 having the CPW line structure may also be implemented in the form of the metal mesh lines. In detail, the inner conductor region 1121 may include metal mesh lines like the feeder. The outer conductor region 1122 may also include metal mesh lines. A detailed configuration of the CPW transmission line 1120 including the metal mesh lines will be described hereinafter.

Accordingly, the transmission line 1120 having the CPW line structure may include the metal mesh lines disposed on the dielectric to form the transparent region. The antenna 1110 may also include the metal mesh lines disposed on the dielectric, so as to form the transparent region. Therefore, the antenna 1110 and the transmission line 1120 of the CPW line structure may be disposed on the dielectric of the same layer.

On the other hand, in the metal mesh slot antenna structure of FIGS. 5 to 7 and FIGS. 10A to 10C, the radiator region 1100R implemented as the patch antenna may not be necessarily configured to be connected to the ground 1122 of the transmission line 1120. Therefore, the metal mesh antenna may not be necessarily limited to the slot antenna, and may operate as a patch antenna. The patch antenna may have a slot region therein in terms of size reduction or wideband implementation.

Figure 13:
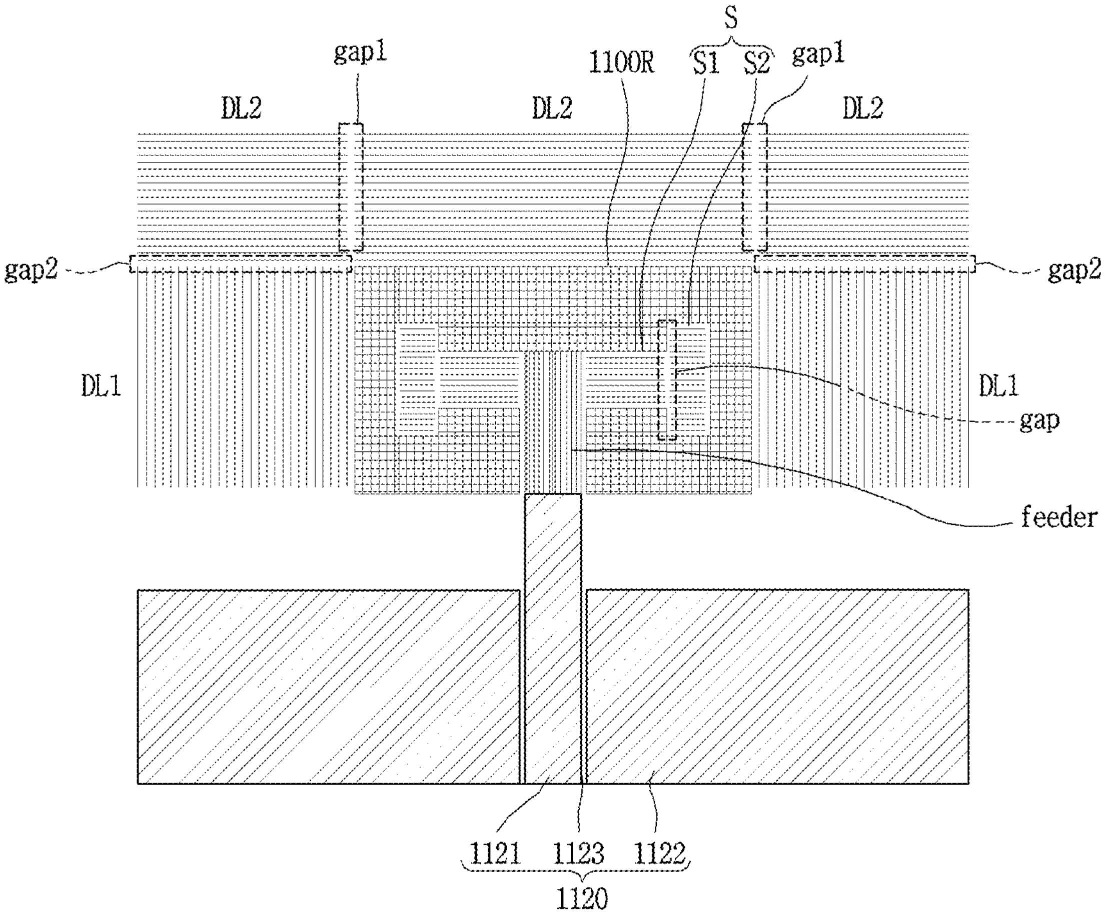
FIG. 13 illustrates a patch antenna having slots of a metal mesh structure in accordance with another implementation.
Figure 14:
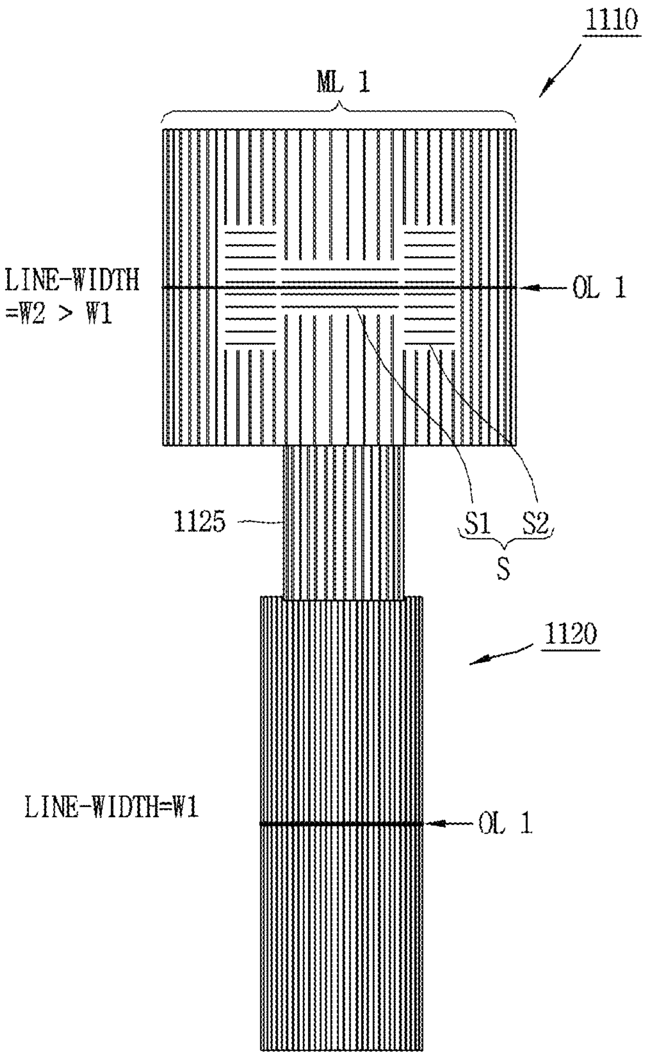
FIG. 14 illustrates an example of a structure in which a CPW transmission line is connected to a patch antenna of a metal mesh structure having a slot region S.

FIG. 13 illustrates a patch antenna having slots of a metal mesh structure in accordance with another implementation. FIG. 14 is a structure in which a CPW transmission line is connected to a patch antenna of a metal mesh structure having a slot region S. The patch antenna 1110 of the metal mesh structure may include a slot region S including a first slot region S1 and a second slot region S2.

The patch antenna 1110 may not be connected to the transmission line 1120 having the CPW line structure. Accordingly, the patch antenna 1110 of FIG. 14 does not operate as a slot antenna but may correspond to a patch antenna having a slot. In addition, the transmission line 1120 having the CPW line structure may be connected to the first slot region S1, so that an electric field is produced at the slot region S and a signal is radiated accordingly. Accordingly, the electronic device having the antenna of FIG. 14 may include the antenna 1110 and the transmission line 1120.

The antenna 1110 may operate with being disposed inside the display. The transmission line 1120 may feed the antenna 1110. Specifically, the antenna 1110 may include a feeder and a slot region S.

The feeder may include metal mesh lines that are connected to the transmission line 1120 and disposed in parallel to a boundary of the transmission line 1120. The feeder, similar to the transmission line 1120, may be implemented as a CPW line or as a metal mesh of a microstrip line without a ground. The feeder may be formed in a structure having a line width (i.e., a characteristic impedance value) different from that of the inner conductor region 1121 of the transmission line 1120. In this case, the feeder may be a matching portion configured to match the inner conductor region 1121 of the transmission line 1120 and the antenna 1110.

When the feeder in FIG. 13 has the CPW line structure, metal mesh lines disposed parallel to the feeder may exist in a ground region spaced apart from the feeder. On the other hand, when the feeder is implemented as the microstrip line, dummy patterns may exist in a dielectric region spaced apart from the feeder.

According to another implementation, an orthogonal slot structure may also be used even for a patch antenna having a slot region therein. FIG. 14 illustrates a patch antenna that has an orthogonal metal mesh structure and includes a slot region therein in accordance with another implementation.

Referring to FIG. 14, the patch antenna 1110 may include a slot region S therein. The slot region S may be disposed inside the patch antenna 1110 or disposed on a lower layer of the patch antenna 1110. The patch antenna 1110 may be connected to the inner conductor of the CPW line 1120, that is, to the strip line through a matching portion 1125.

The slot region S may include a first slot region S1 and a second slot region S2. The first slot region S1 may include orthogonal metal mesh lines. The second slot region S2 may include a slot having a width different from that of the first slot region S1, and the slot (i.e., a boundary, namely, an end portion of the slot) and the orthogonal metal mesh lines of the first slot region may be separated by a gap. Also, the second slot region S2 may include second orthogonal metal mesh lines that are parallel to the orthogonal metal mesh lines of the first slot region S1.

Accordingly, in addition to the slot antenna (FIGS. 7 and 10B) radiating a signal from the slot region, the patch antenna (FIG. 14) having the slot therein may be configured such that the slot region S includes orthogonal metal mesh lines. This can allow the slot region S to be clearly separated electrically from the radiator region from the perspective of a signal of an operating frequency band. Accordingly, the antenna characteristics can be more improved than that in the case where the metal mesh lines are removed from the slot region S. Also, the antenna characteristics can be improved compared to the case where the mesh lines are arranged in a different shape in the slot region S.

Figure 15A:
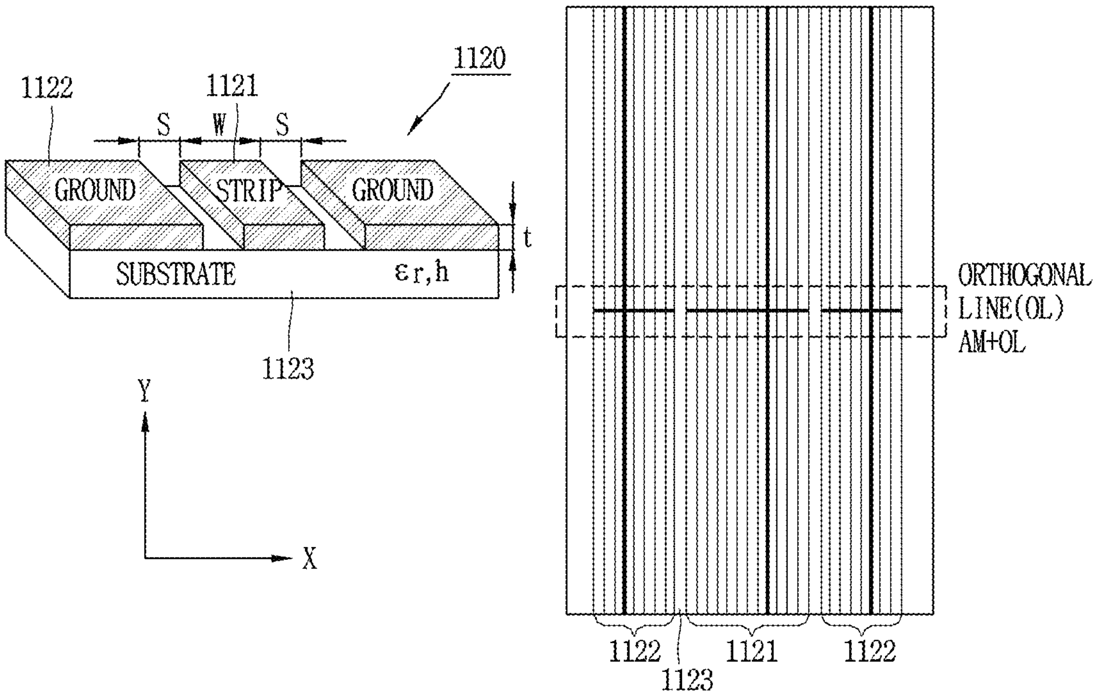
FIGS. 15A to 15C illustrate AM (Adaptive Mesh)+OL (Orthogonal Line) structure, AM+IM (Irregular Mesh) structure, and AM+OL+IM structure for a low-loss metal mesh CPW transmission line.
Figure 15B:
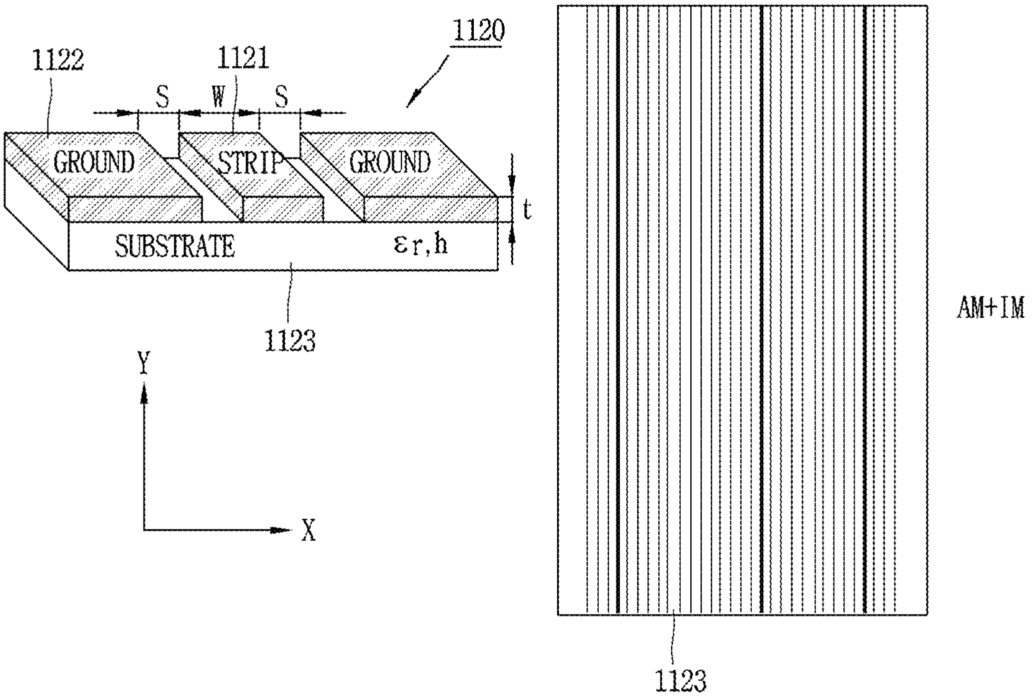
Figure 15C:
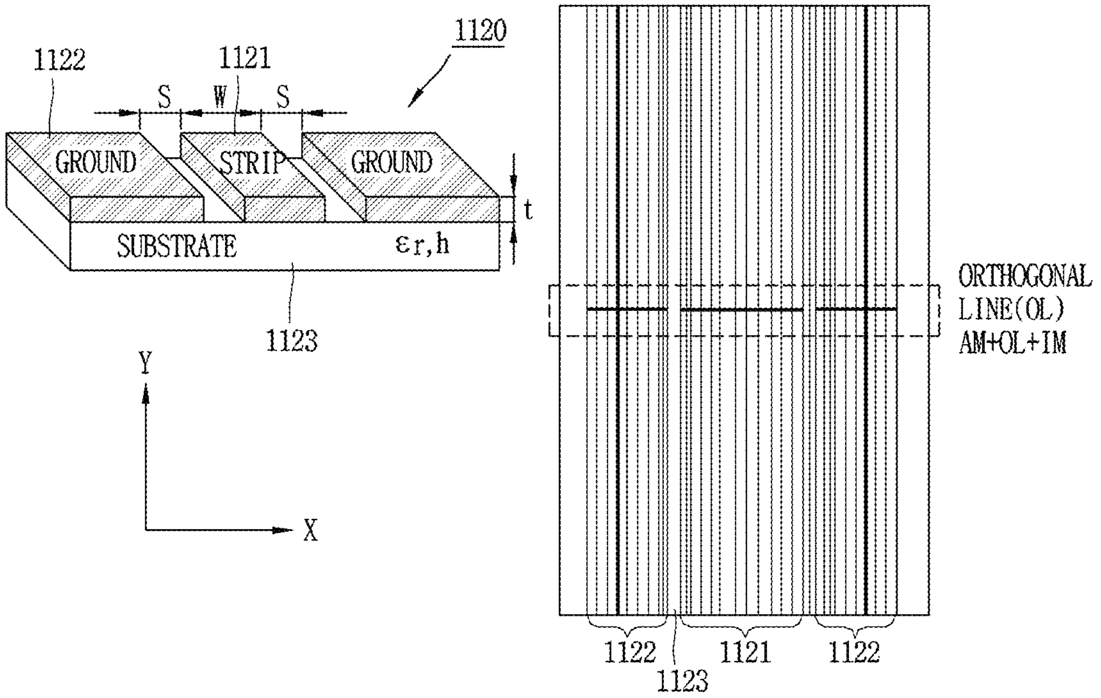

In some examples, the transmission line of the CPW line structure may also be implemented to have a metal mesh structure. FIGS. 15A to 15C illustrate AM (Adaptive Mesh)+OL (Orthogonal Line) structure, AM+IM (Irregular Mesh) structure, and AM+OL+IM structure for a low-loss metal mesh CPW transmission line.

Specifically, FIGS. 15A and 15B illustrate examples of a case in which orthogonal lines are added and a case in which a non-regular mesh structure is applied in an adaptive mesh structure, respectively. FIG. 15A illustrates a case where orthogonal lines OL are added at predetermined intervals in a transmission line having an adaptive mesh (AM) structure. On the other hand, FIG. 15B illustrates a case where an irregular mesh (IM) structure is applied in which metal meshes are disposed at irregular intervals in the transmission line of the adaptive mesh (AM) structure. Accordingly, the transmission line according to (a) of FIG. 6 and the transmission line according to (b) of FIG. 6 may be referred to as an AM+OL structure and an AM+IM structure, respectively.

FIG. 15C illustrates a case where orthogonal lines are added and a non-regular mesh structure is applied in the adaptive mesh structure. FIG. 15C illustrate a case where orthogonal lines OL are added at a predetermined interval and the interval between metal meshes is irregular in the transmission line of the adaptive mesh (AM) structure.

In this regard, the AM structure may be a structure in which metal mesh lines are arranged only in a direction parallel to a boundary line of the transmission line 1120. Accordingly, in view of similar transparency, the metal mesh lines can be arranged at more precise intervals in the AM structure than a square mesh structure. The OL structure may be a structure in which orthogonal lines are added at predetermined intervals, for example, half-wavelengths or quarter-wavelengths, to be orthogonal to the boundary line of the transmission line 1120. This can result in improving reliability upon canceling a reflection signal between metal mesh lines and upon a line disconnection. In addition, the IM structure may be a method for increasing a metal mesh line density in a region having a high electric field distribution, such as a region near a boundary between the strip line 1121 and the ground 1222 of the transmission line 1120. That is, the IM structure may be a structure in which metal mesh lines are added to be arranged at more precise intervals in a region having a high electric field distribution, such as a region near a boundary between the strip line 1121 and the ground 1222 of the transmission line 1120.

In some examples, the antenna having the metal mesh structure may be configured as an array antenna for beamforming. Referring to FIG. 4A, a plurality of antennas ANT1 to ANT4 and a transmission line 1120 to feed the antennas ANT1 to ANT4 may be provided. Here, each of the plurality of antennas ANT1 to ANT4 may be configured as an array antenna to perform beamforming.

Figure 16:
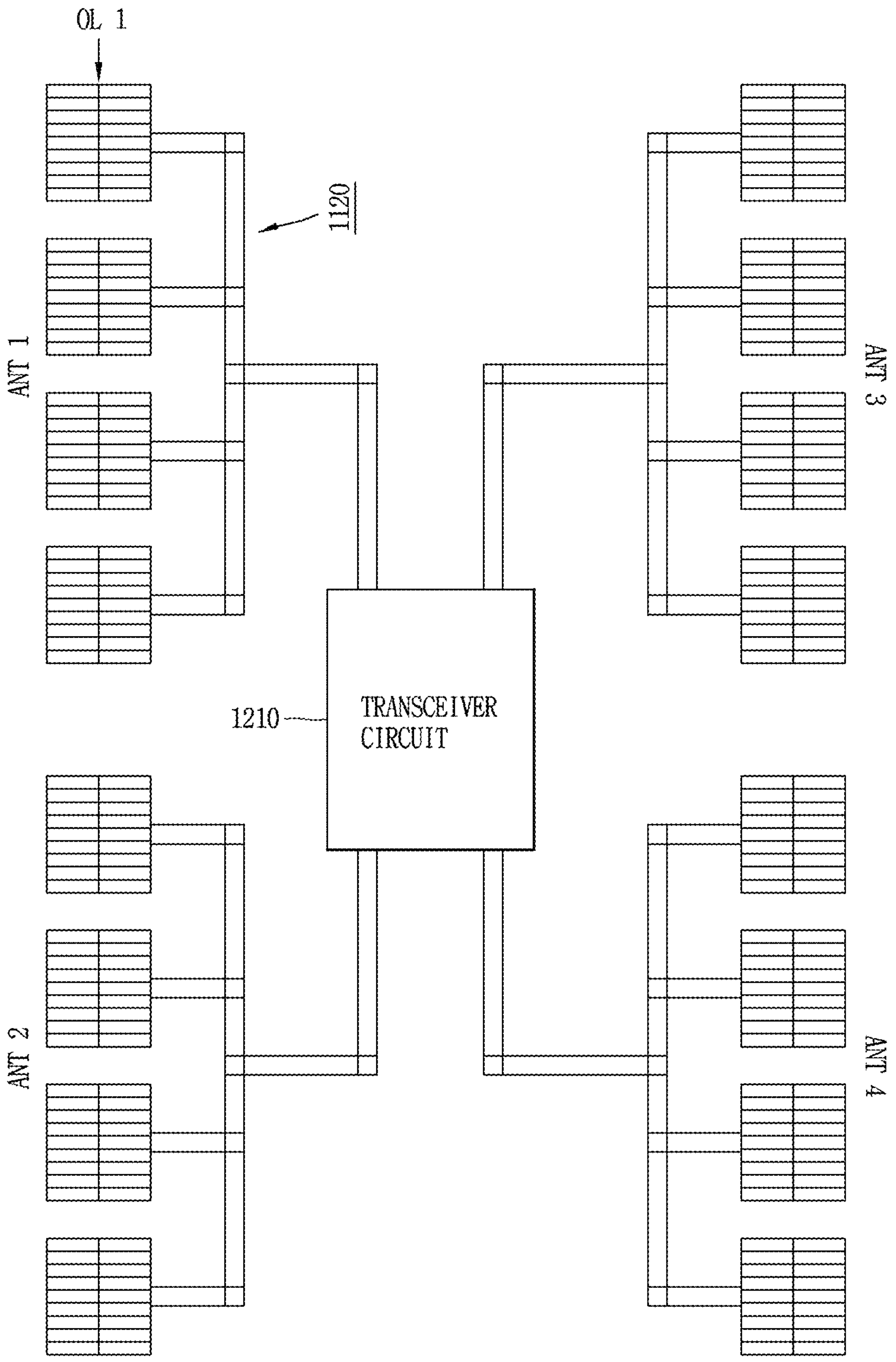
FIG. 16 illustrates an example in which a transparent antenna is applied as an array antenna.

FIG. 16 illustrates an example in which a transparent antenna is applied as an array antenna. Referring to FIGS. 14 and 16, each antenna element 1110 of the array antenna may be connected to the inner conductor of the CPW line, that is, the strip line 1121 through the matching portion 1125. The electronic device may further include a transceiver circuit 1210. The transceiver circuit 1210 may be disposed on the rear surface of the display 151 and connected to each antenna element of the array antenna, so as to transmit a signal to each antenna element.

Referring to FIGS. 2, 4A, 14, and 16, the array antennas may include first to fourth array antennas 1110*a* to 1110*d* or ANT1 to ANT4 that are disposed on upper left, upper right, lower left, and lower right sides inside the display 151 of the electronic device.

Here, the transceiver circuit 1210 may be configured to transmit signals to the first to fourth array antennas to ANT1 to ANT4. To this end, the transceiver circuit 1210 may be configured as one transceiver circuit to transmit signals to the first to fourth array antennas to ANT1 to ANT4. Alternatively, the transceiver circuit 1210 may be configured as first to fourth transceiver circuits to transmit signals to the first to fourth array antennas to ANT1 to ANT4, respectively. In this regard, each of the first to fourth transceiver circuits may independently perform beamforming for each of the first to fourth array antennas ANT1 to ANT4 through a phase controller such as a phase shifter.

In some examples, the transceiver circuit 1210 may transmit a signal by selecting one of the first to fourth array antennas to ANT1 to ANT4. The transceiver circuit 1210 may also perform MIMO by selecting two or more of the first to fourth array antennas ANT1 to ANT4. In this regard, the transceiver circuit 1210 may control the phase controller so that each beam direction for MIMO is different.

Hereinafter, an electronic device having a slot type antenna disposed inside a display will be described. Hereinafter, an electronic device having a slot type antenna embedded in a display according to different aspects will be described. In this regard, the previous descriptions will all be applicable to the following description of an electronic device having a slot type array antenna.

Referring to FIGS. 2 to 15, the electronic device having the slot-type array antenna embedded in the display may include the display 151 and the array antennas ANT1 to ANT4. The array antennas ANT1 to ANT4 may be disposed inside the display 151 and each may include metal mesh lines.

Specifically, each antenna element of the array antennas ANT1 to ANT4 may include a feeder and a slot region S. Here, the feeder may include metal mesh lines that are connected to the transmission line 1120 and disposed in parallel to a boundary of the transmission line 1120. The slot region S may be defined inside each of the antennas ANT1 to ANT4 and may include the orthogonal metal mesh lines disposed to be orthogonal to the metal mesh lines of the feeder.

The slot region S may include a first slot region S1 and a second slot region S2. The first slot region S1 may include orthogonal metal mesh lines. The second slot region S2 may include a slot having a width different from that of the first slot region S1, and may be separated by a gap from the orthogonal metal mesh lines of the first slot region. Also, the second slot region S2 may include second orthogonal metal mesh lines that are parallel to the orthogonal metal mesh lines of the first slot region S1.

Each antenna element of the array antennas ANT1 to ANT4 may further include a radiator region 1100R in addition to the slot region S. The radiator region 1100R may include square mesh lines and radiate a signal transmitted from the feeder.

In some examples, the electronic device having the slot-type array antenna may further include dummy metal lines DL1 and DL2. The first dummy metal lines DL1 may be disposed at one region and another region both adjacent to the radiator region 1100R. Specifically, the first dummy metal lines DL1 may be parallel to the metal mesh lines of the feeder and orthogonal to the orthogonal metal mesh lines of the slot region S.

The second dummy metal lines DL2 may be disposed at an upper region adjacent to the radiator region. On the other hand, the second dummy metal lines DL2 may be orthogonal to the metal mesh lines of the feeder and parallel to the orthogonal metal mesh lines of the slot region S. Accordingly, a gap gap1 may be defined between the dummy metal lines disposed at left and right regions of the upper region and the dummy metal lines disposed at a central region of the upper region.

So far, the electronic device having the transparent antenna embedded in the display has been described. Hereinafter, technical effects of the electronic device having the transparent antenna embedded in the display will be described.

In some implementations, in an electronic device having a transparent antenna, metal mesh lines may also be arranged in a slot region and a dielectric region, in addition to an antenna region, to be orthogonal to metal mesh lines on the antenna region, thereby improving electrical characteristics in a high frequency band.

In some implementations, a problem of deteriorating visibility due to non-arrangement of metal mesh lines in a specific region of a display having a transparent antenna can be prevented.

In some implementations, in an electronic device having a transparent antenna, visibility can be improved by metal mesh lines arranged to be orthogonal to an antenna region and dummy mesh lines, thereby enhancing electrical characteristics such as antenna efficiency and the like.

Further scope of applicability of the present disclosure will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

In relation to the aforementioned present disclosure, design and operations of an electronic device having a transparent antenna having a complementary mesh structure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180, 1210*a* to 1210*d*, 1250 of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. An electronic device, comprising:

an antenna embedded and operating in a display; and a transmission line configured to feed the antenna;

wherein the antenna comprises:

a feeder connected to the transmission line and including metal mesh lines arranged parallel to a boundary of the transmission line; and a slot region defined inside the antenna and including orthogonal metal mesh lines arranged in a direction orthogonal to the metal mesh lines of the feeder, wherein the slot region has a T-shape and comprises:

a first slot region including the orthogonal metal mesh lines; and a second slot region connected to the first slot region via a gap that contains no metal mesh lines, the second slot region having a slot with a width different from a width of a slot of the first slot region, the second slot region separated by the gap from the orthogonal metal mesh lines in the slot of the first slot region, the second slot region including second orthogonal metal mesh lines parallel to the orthogonal metal mesh lines in the first slot region.

2. The electronic device of claim 1, wherein the antenna further comprises a radiator region configured in a square mesh line form to radiate a signal transmitted from the feeder.

3. The electronic device of claim 2, wherein first dummy metal lines are further arranged on one side region and another side region adjacent to the radiator region, and wherein the first dummy metal lines are parallel to the metal mesh lines of the feeder and orthogonal to the orthogonal metal mesh lines of the slot region.

4. The electronic device of claim 3, wherein second dummy metal lines are further arranged on an upper region adjacent to the radiator region, and wherein the second dummy metal lines are orthogonal to the metal mesh lines of the feeder and parallel to the orthogonal metal mesh lines of the slot region.

5. The electronic device of claim 4, wherein a first gap is defined between the second dummy metal lines arranged on right and left regions of the upper region and the second dummy metal lines arranged on a central region of the upper region, to prevent a generation of surface current on a dielectric substrate.

6. The electronic device of claim 5, wherein the second dummy metal lines arranged on the central region of the upper region has an electrical length corresponding to a substantially half-wavelength of an operating frequency, to prevent interference with respect to the second dummy metal lines arranged on the left and right regions of the upper region.

7. The electronic device of claim 4, wherein the first dummy metal lines and the second dummy metal lines are arranged to be orthogonal to each other, and wherein a second gap is defined between the first dummy metal lines and the second dummy metal lines to prevent a generation of surface current on a dielectric substrate.

8. The electronic device of claim 1, wherein the transmission line is configured to have a Co-Planar Waveguide (CPW) line structure that comprises:

an inner conductor region operating as a signal line;

an outer conductor region operating as a ground; and a dielectric region disposed between the inner conductor region and the outer conductor region.

9. The electronic device of claim 8, wherein the antenna includes metal mesh lines disposed on a dielectric to define a transparent region, and wherein the CPW line structure includes printed metal patterns disposed on the dielectric to define a non-transparent region.

10. The electronic device of claim 9, wherein the antenna and the CPW line are disposed on dielectrics of different layers, and wherein the CPW line is disposed below the antenna and a signal transmitted through the CPW line is radiated through the slot region.

11. The electronic device of claim 8, wherein the CPW line structure includes metal mesh lines disposed on a dielectric to define a transparent region, and wherein the antenna includes metal mesh lines disposed on the dielectric to define the transparent region.

12. The electronic device of claim 11, wherein the antenna and the CPW line are disposed on a dielectric of the same layer, and wherein the inner conductor region of the CPW line comprises a strip line that is connected to the feeder.

13. The electronic device of claim 8, wherein the antenna is configured as an array antenna for beamforming, wherein each antenna element of the array antenna is connected to an inner conductor of the CPW line, and wherein the electronic device further comprises a transceiver circuit disposed on a rear surface of the display, connected to each antenna element of the array antenna, and configured to transmit a signal to each antenna element.

14. The electronic device of claim 13, wherein the array antenna comprises first to fourth array antennas disposed at upper left, upper right, lower left, and lower right portions inside the display of the electronic device, and wherein the transceiver circuit further includes first to fourth transceiver circuits configured to transmit signals to the first to fourth array antennas, respectively.

15. An electronic device, comprising:

a display; and an array antenna disposed inside the display and including metal mesh lines, and wherein each antenna element of the array antenna comprises:

a feeder connected to a transmission line and including metal mesh lines arranged parallel to a boundary of the transmission line; and a slot region defined inside the antenna element and including orthogonal metal mesh lines arranged in a direction orthogonal to the metal mesh lines of the feeder, wherein the slot region has a T-shape and comprises:

a first slot region including the orthogonal metal mesh lines; and a second slot region connected to the first slot region via a gap that contains no metal mesh lines, the second slot region having a slot with a width different from a width of a slot of the first slot region, the second slot region separated by the gap from the orthogonal metal mesh lines in the slot of the first slot region, the second slot region including second orthogonal metal mesh lines parallel to the orthogonal metal mesh lines in the first slot region.

16. The electronic device of claim 15, wherein each antenna element further comprises a radiator region configured in a square mesh line form to radiate a signal transmitted from the feeder.

17. The electronic device of claim 16, wherein first dummy metal lines are further arranged on one side region and another side region adjacent to the radiator region, and wherein the first dummy metal lines are parallel to the metal mesh lines of the feeder and orthogonal to the orthogonal metal mesh lines of the slot region.

18. The electronic device of claim 17, wherein second dummy metal lines are further arranged on an upper region adjacent to the radiator region, and wherein the second dummy metal lines are orthogonal to the metal mesh lines of the feeder and parallel to the orthogonal metal mesh lines of the slot region, and a gap is defined between the second dummy metal lines arranged on right and left regions of the upper region and the second dummy metal lines arranged on a central region of the upper region.

* * * * *